(12) United States Patent
Kido

(10) Patent No.: US 9,277,063 B2
(45) Date of Patent: Mar. 1, 2016

(54) IMAGE PROCESSING APPARATUS, IMAGE PROCESSING METHOD AND STORAGE MEDIUM STORING PROGRAM

(71) Applicant: CANON KABUSHIKI KAISHA, Tokyo (JP)

(72) Inventor: Hideyuki Kido, Isehara (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/178,571

(22) Filed: Feb. 12, 2014

(65) Prior Publication Data

US 2014/0233071 A1    Aug. 21, 2014

(30) Foreign Application Priority Data

Feb. 21, 2013  (JP) ................. 2013-032440

(51) Int. Cl.
  *G06K 15/02*  (2006.01)
  *H04N 1/00*  (2006.01)
  *H04N 1/387*  (2006.01)
  *H04N 1/60*  (2006.01)

(52) U.S. Cl.
  CPC ......... *H04N 1/00087* (2013.01); *H04N 1/0005* (2013.01); *H04N 1/00013* (2013.01); *H04N 1/00042* (2013.01); *H04N 1/00045* (2013.01); *H04N 1/00063* (2013.01); *H04N 1/3878* (2013.01)

(58) Field of Classification Search
  USPC ........................ 358/3.26, 1.9; 347/14, 19, 10
  See application file for complete search history.

(56) References Cited

U.S. PATENT DOCUMENTS

| 2005/0073703 | A1* | 4/2005 | Nakane .......................... 358/1.9 |
| 2011/0012984 | A1* | 1/2011 | Jackson et al. ................ 347/238 |
| 2011/0043865 | A1* | 2/2011 | Wagner ........................ 358/3.27 |

FOREIGN PATENT DOCUMENTS

JP    8-97974 A    4/1996

* cited by examiner

*Primary Examiner* — Quang N Vo
(74) *Attorney, Agent, or Firm* — Fitzpatrick, Cella, Harper & Scinto

(57) ABSTRACT

A reading unit, which reads images, reads an image of a predetermined pattern that includes a plurality of marks and is printed on a printing medium by executing scanning relative to the printing medium. Image data acquired by this reading is acquired. Reading adjustment values are specified in accordance with displacement amounts of a plurality of regions with respect to ideal positions. The plurality of regions are formed based on the plurality of patterns included in the acquired image data. Reading processing of a reading mechanism is corrected in accordance with the specified reading adjustment values.

24 Claims, 14 Drawing Sheets

F I G. 5A
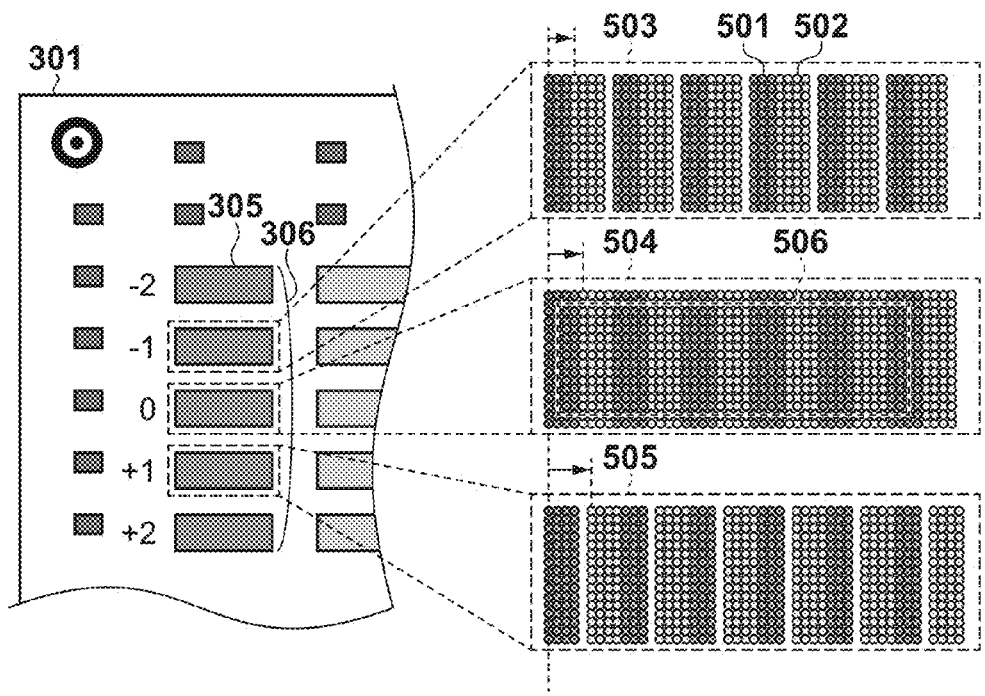
F I G. 5B
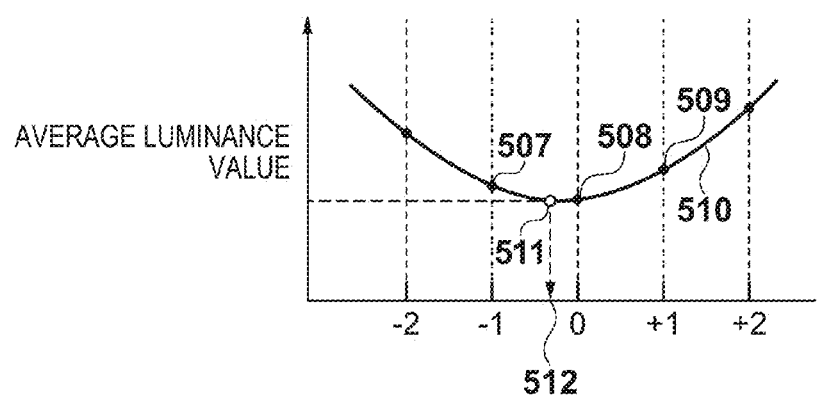

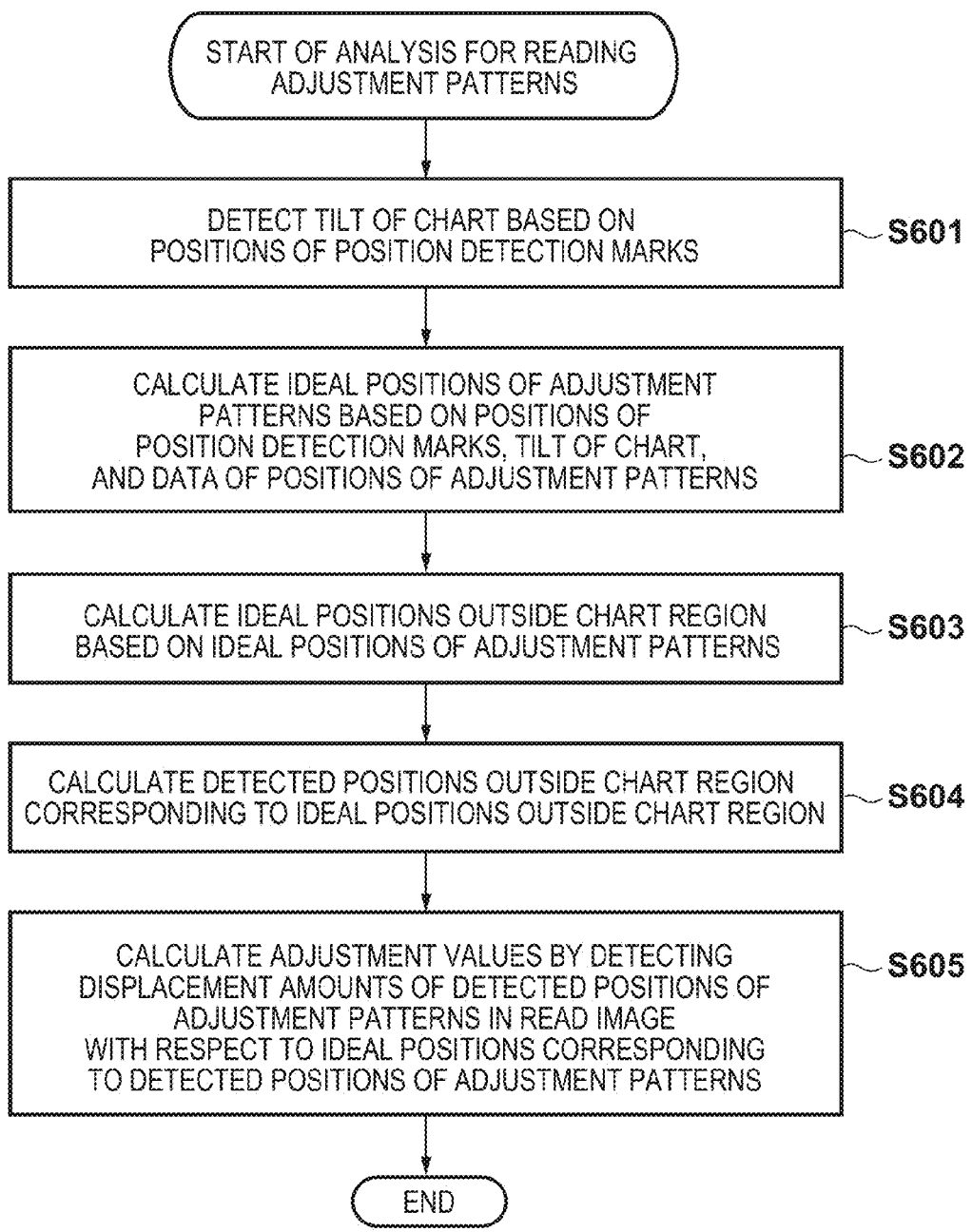

FIG. 9A
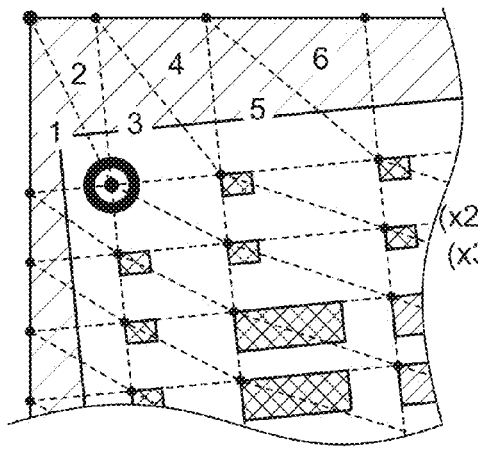
FIG. 9B
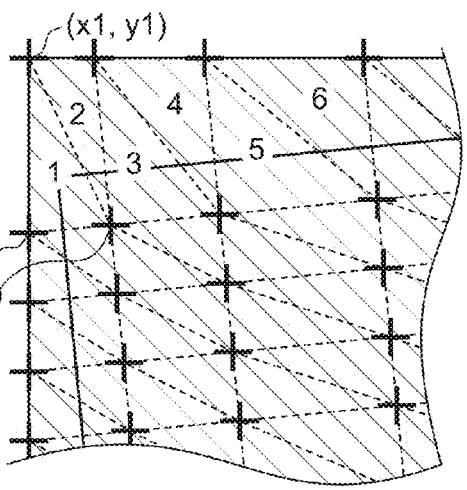
FIG. 9C
|   | $(x_1, y_1)$ | $(x_2, y_2)$ | $(x_3, y_3)$ | $a_{11}$ | $a_{12}$ | $a_{21}$ | $a_{22}$ | $t_x$ | $t_y$ |
|---|---|---|---|---|---|---|---|---|---|
| 1 | (0, 0) | (0, 110) | (38, 106) | 1.07 | 0.00 | 0.04 | 0.99 | 0.00 | 0.00 |
| 2 | (0, 0) | (38, 106) | (30, 0) | 1.00 | 0.10 | 0.00 | 1.04 | 0.00 | 0.00 |
| 3 | (30, 0) | (38, 106) | (86, 100) | 1.00 | 0.10 | 0.00 | 1.05 | 0.01 | 0.02 |
| 4 | (30, 0) | (86, 100) | (84, 0) | 0.99 | 0.00 | 0.00 | 0.99 | 0.03 | 0.04 |
| 5 | (84, 0) | (86, 100) | (153, 93) | 0.99 | 0.01 | 0.00 | 1.00 | 0.03 | 0.04 |
| 6 | (84, 0) | (153, 93) | (137, 0) | 0.99 | 0.09 | 0.00 | 0.99 | 0.03 | 0.03 |

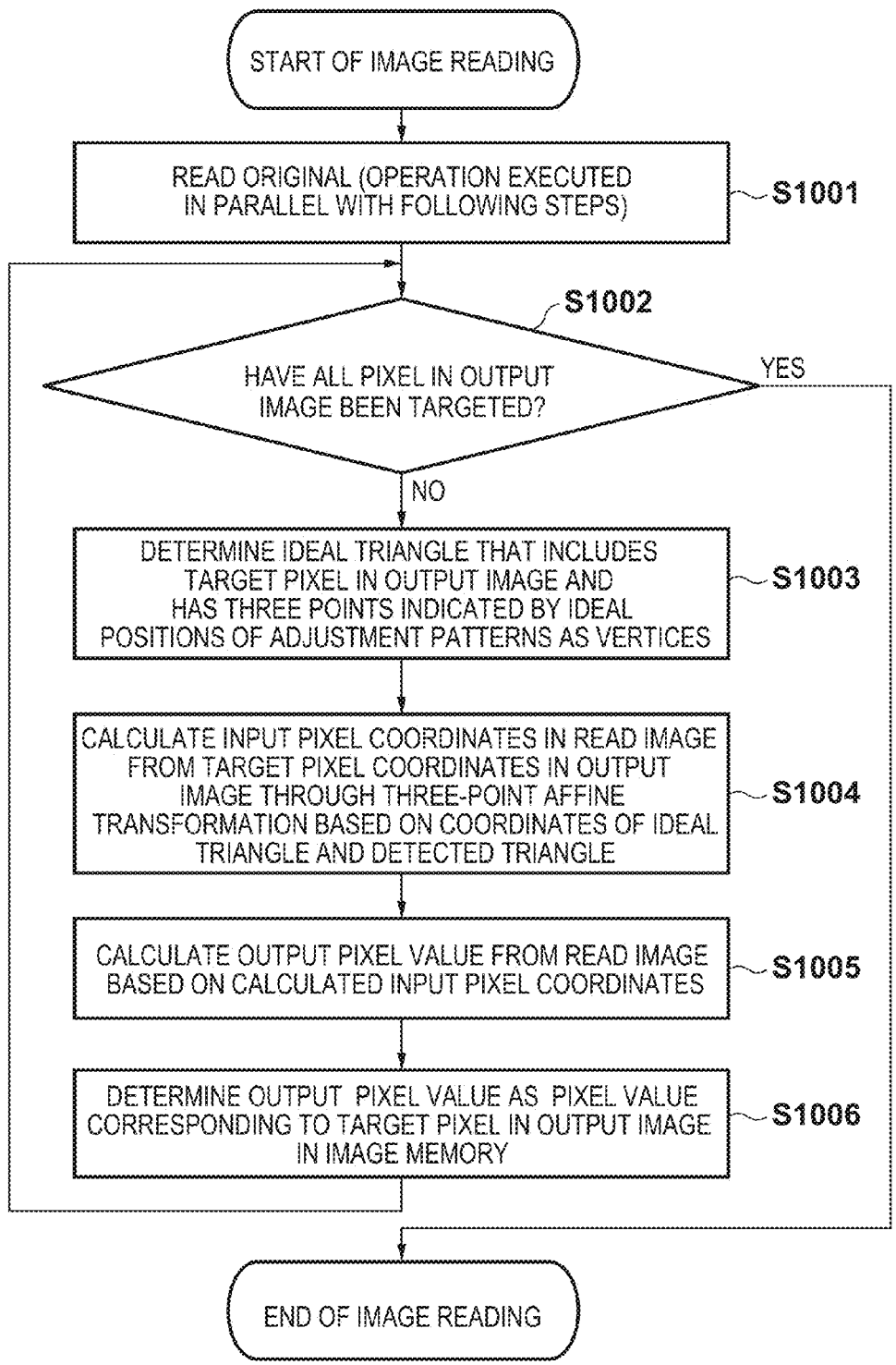

FIG. 12A
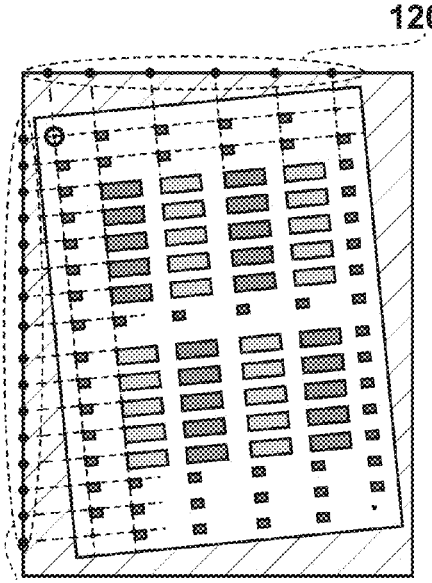
FIG. 12B
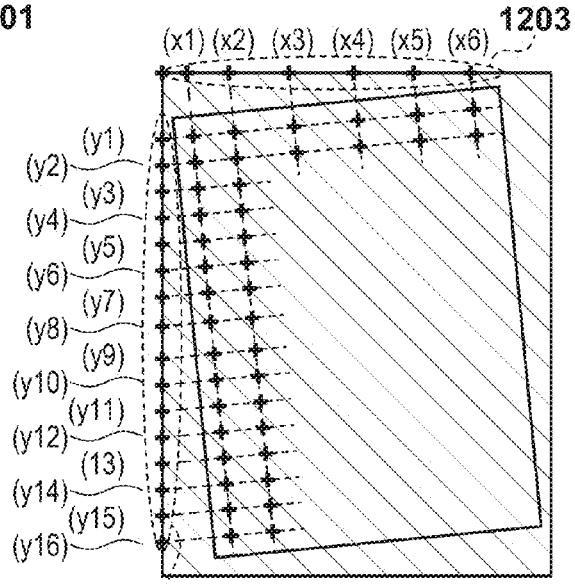
FIG. 12C
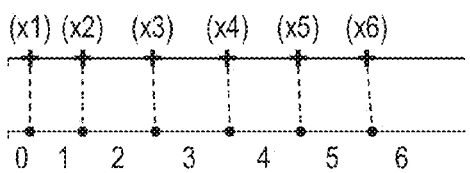
FIG. 12D
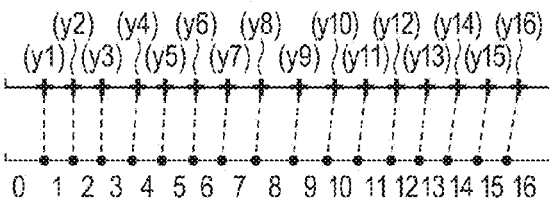
FIG. 12E
|   | $x_s$ | $x_e$ | $a_x$ | $t_x$ |
|---|---|---|---|---|
| 0 | 0 | 151 | 1.05 | 0.0 |
| 1 | 152 | 536 | 1.04 | 159.6 |
| 2 | 537 | 911 | 1.05 | 560.0 |
| 3 | 912 | 1288 | 1.06 | 953.8 |
| 4 | 1289 | 1659 | 1.05 | 1353.4 |
| 5 | 1660 | 2025 | 1.04 | 1742.9 |
| 6 | 2025 | 2551 | 1.03 | 2122.5 |
FIG. 12F
|   | $y_s$ | $y_e$ | $a_y$ |
|---|---|---|---|
| 0 | 0 | 215 | 1.00 |
| 1 | 216 | 411 | 1.00 |
| 2 | 412 | 618 | 0.99 |
| 3 | 619 | 825 | 0.98 |
| 4 | 826 | 1034 | 0.97 |
| 5 | 1035 | 1242 | 0.97 |
| 6 | 1243 | 1452 | 0.97 |

IMAGE PROCESSING APPARATUS, IMAGE PROCESSING METHOD AND STORAGE MEDIUM STORING PROGRAM

BACKGROUND OF THE INVENTION

1. Field of the Invention

The present invention relates to an image processing apparatus that processes an image read by a reading unit, an image processing method, and a storage medium storing a program.

2. Description of the Related Art

Methods for reading an image of an original are conventionally known, examples of which include a method for reading an image by moving an optical system, such as image sensors, so as to scan an original placed on an original plate to be read, and a method for reading an image by moving an original to be read with respect to a fixed optical system.

Also, an inkjet printing apparatus that executes printing by discharging ink from a printing head may execute optical reading to adjust printing positions. That is to say, the inkjet printing apparatus can specify a printing condition with a small displacement in printing positions by printing a test chart for adjusting the printing positions on a printing medium and by optically reading the printed test chart. More specifically, a test chart including a plurality of patterns corresponding to different printing conditions is printed on a printing medium. After optically reading the printed test chart, a printing condition corresponding to one of the plurality of patterns with a small printing displacement is specified, and a correction value for the actual image printing is determined in accordance with the specified printing condition. This makes it possible to adjust a displacement in printing positions attributed to, for example, error in the manufacturing accuracy and assembly during a manufacturing process for the printing head.

However, in this case, if a reading displacement and the like have occurred at the time of image reading, a displacement in printing positions cannot be adjusted appropriately. In view of this, Japanese Patent Laid-Open No. 8-97974 suggests detection of displacement amounts of reading start positions in a main scanning direction and a sub scanning direction by reading a reference original on which an image of reference data is printed.

In the aforementioned methods for optically reading an image, the read image may be distorted due to, for example, the following reasons. Aberration of an optical system caused by, for example, an error in manufacturing accuracy and assembly during a manufacturing process for the optical system may alter a scale factor in the main scanning direction, and hence distort the read image. Also, the driving accuracy of a driving system that drives the optical system and an original to be read may alter a scale factor in the sub scanning direction, and hence distort the read image. Furthermore, the read image could possibly be distorted if an image is read by moving the optical system and the original to be read in the state where a column direction of elements (pixels) of line-type image sensors (the main scanning direction) is not perpendicular to the sub scanning direction. Moreover, depending on the accuracy at which a member for guiding the movement of the optical system is formed, the read image could possibly be distorted if an angle of a pixel column direction of the image sensors changes in accordance with the movement of the optical system.

However, with Japanese Patent Laid-Open No. 8-97974, the aforementioned distortion of the read image cannot be fixed. That is to say, merely detecting the displacement amounts of the reading start positions in the main scanning direction and the sub scanning direction can do nothing but shift the read image in the main scanning direction or the sub scanning direction as a whole, thereby leaving the read image in a distorted state. Therefore, the aforementioned displacement in the printing positions cannot be adjusted appropriately. Furthermore, distortion of a read image in optical reading exerts influence on matters other than the aforementioned adjustment of the displacement in the printing positions in the inkjet printing apparatus.

SUMMARY OF THE INVENTION

An aspect of the present invention is to eliminate the above-mentioned problems with the conventional technology. The present invention provides an image processing apparatus that reduces the influence of distortion of a read image, an image processing method, and a storage medium storing a program.

The present invention according to one aspect provides an apparatus comprising: an acquisition unit configured to acquire image data acquired by a reading unit reading an image of a predetermined pattern printed on a printing medium, wherein the reading is performed by the reading unit executing scanning relative to the printing medium, and the predetermined pattern includes a plurality of marks; a specification unit configured to specify reading adjustment values in accordance with displacement amounts of a plurality of regions with respect to corresponding ideal positions, wherein the plurality of regions are formed based on the plurality of patterns included in the image data acquired by the acquisition unit; and a correction unit configured to correct reading processing of the reading unit in accordance with the reading adjustment values specified by the specification unit.

According to the present invention, the influence of distortion of a read image acquired by a reading unit can be reduced.

Further features of the present invention will become apparent from the following description of exemplary embodiments with reference to the attached drawings.

BRIEF DESCRIPTION OF THE DRAWINGS

FIGS. 5A and 5B are diagrams for illustrating the analysis of printing adjustment patterns.

FIG. 6 shows a procedure of processing for analyzing reading adjustment patterns.

FIGS. 9A to 9C are diagrams for illustrating reading adjustment values according to a first embodiment.

FIG. 10 shows a procedure of processing for correcting a read image.

FIGS. 12A to 12F are diagrams for illustrating reading adjustment values according to a second embodiment.

DESCRIPTION OF THE EMBODIMENTS

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that like constituent elements will be denoted by like reference signs, and redundant descriptions thereof will not be given.

[First Embodiment]

Figure 1:
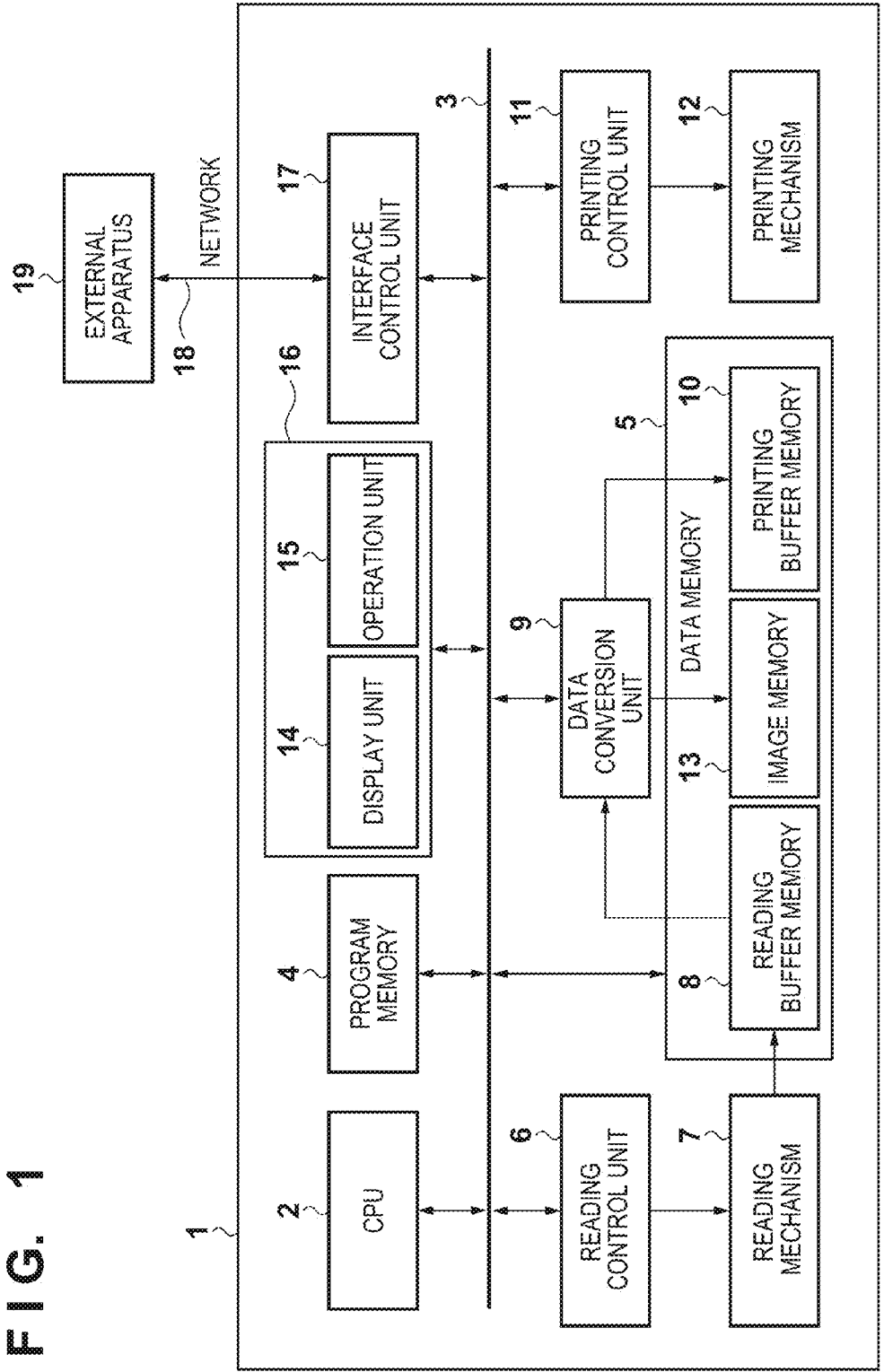
FIG. 1 is a block diagram showing a configuration of an image processing apparatus.

FIG. 1 is a block diagram showing a configuration of an image processing apparatus 1 according to an embodiment of the present invention. A CPU 2 realizes processing of the present embodiment by executing a control program stored in a program memory 4 and by using various types of data stored in a data memory 5. For example, the program memory 4 and the data memory 5 are constituted by a ROM and a non-volatile RAM, respectively. The data memory 5 includes a reading buffer memory 8, a printing buffer memory 10, and an image memory 13.

The image processing apparatus 1 includes a printing unit and a reading unit, which are indicated as a printing mechanism 12 and a reading mechanism 7, respectively. The printing mechanism 12 prints an image while conveying a printing medium, such as a printing sheet, set on a sheet feeding tray. For example, the printing mechanism 12 is configured as an inkjet printer that executes printing by discharging drops of ink, which is a printing agent, while causing a serial printing head to scan in a direction intersecting a conveyance direction of the printing medium. The CPU 2 reads printing data stored in the printing buffer memory 10 and outputs the printing data to a printing control unit 11. By controlling the printing mechanism 12 via the printing control unit 11, the CPU 2 controls ejection/non-ejection of the ink, the amount of ejection (discharge), and the like based on the printing data so as to print an image on the printing medium. The printing head includes a plurality of nozzle rows constituted by a plurality of nozzle groups corresponding to a plurality of ink colors, and the printing control unit 11 controls discharge of the ink while causing the printing head to execute reciprocative scanning based on printing data for forward scanning and on printing data for backward scanning, separately. The ink may be discharged, for example, by propelling ink bubbles through film boiling caused by heat from a heater arranged behind the nozzles, or by pressure applied by deformation of piezoelectric elements. Furthermore, at the time of printing the image, instead of conveying the printing medium, it is permissible to make the printing head scan in a widthwise direction of the printing medium and then move in a lengthwise direction of the printing medium, in such a manner that the printing head moves in the widthwise direction and the lengthwise direction alternately in a repeated manner. The serial printing head may be replaced with a line-type head that extends across the width of the printing medium and scans only in the lengthwise direction of the printing medium. The printing method is not limited to the inkjet method, and may be an electrophotographic method or a heat transfer method. The following describes an inkjet printing method using a serial printing head as an example. The printing control unit 11 can refer to the content of a memory (data memory 5) storing a printing adjustment value that is used in controlling the printing mechanism 12, and change a method for controlling the printing mechanism 12 in accordance with the adjustment values. In printing processing executed by the printing control unit 11, a position on the printing medium at which the ink is discharged does not exhibit a displacement that is equal to or larger than a predetermined displacement amount.

The reading mechanism 7 optically reads an image of an original placed on an original plate, such as a platen, by scanning the image. The reading mechanism 7 is realized using, for example, a CCD (charge-coupled device) method or a CIS (contact image sensor) method. In the CCD method, while moving a light source that irradiates an original to be read with light, reflected light is read with CCD image sensors. In the CIS method, while moving light-receiving elements (CMOS (complementary metal-oxide-semiconductor) image sensors) formed integrally with a light source, reflected light is read. The CPU 2 controls the reading mechanism 7 via a reading control unit 6. Image data read by the image sensors provided in the reading mechanism 7 is stored in the reading buffer memory 8 of the data memory 5. The image sensors are, for example, arrayed one-dimensionally to constitute a line sensor (line-type image sensors), and read an image on an original while moving an optical system (a light source in the CCD method; a light source and image sensors in the CIS method) in a direction (sub scanning direction) intersecting the direction (main scanning direction) in which the image sensors are arrayed. The reading mechanism 7 may read an image on an original by conveying the original from an original conveyance apparatus with respect to a fixed optical system, instead of reading the image on the original placed on the original plate by moving the optical system. Alternatively, the image on the original may be read by moving both of the optical system and the original in opposing directions. That is to say, the reading control unit 6 causes the image sensors to read the image on the original by moving the optical system included in the reading mechanism 7 and the original relative to each other (sub scanning). Note that the reading method is not limited to the methods described above, and may be selected from among various types of methods. The reading control unit 6 can refer to the content of a memory (data memory 5) storing reading adjustment values that are used in controlling the reading mechanism 7, and change the method for controlling the reading mechanism 7 in accordance with the adjustment values.

In order to execute a copy operation, the CPU 2 causes the reading control unit 6 to read an image using the reading mechanism 7 in accordance with a copy instruction from a user. Resultant image data stored in the reading buffer memory 8 is read, and a data conversion unit 9 converts the read image data into printing data. The converted printing data is stored in the printing buffer memory 10 of the data memory 5. Subsequently, the CPU 2 reads the printing data stored in the printing buffer memory 10, and outputs the read printing data to the printing mechanism 12. The CPU 2 prints an image on a printing medium based on the printing data by controlling the printing mechanism 12 via the printing control unit 11.

The image memory 13 temporarily stores various types of image data, such as image data read by the reading mechanism 7, image data received from an external apparatus 19, and image data acquired from the program memory 4. For example, image data stored in the image memory 13 is read in response to an instruction from the user. For example, the CPU 2 reads image data of a photographic image and the like stored in the image memory 13, and causes the data conversion unit 9 to convert the read image data into printing data. The CPU 2 outputs the converted printing data to the printing mechanism 12, and prints an image on a printing medium based on the printing data by controlling the printing mechanism 12 via the printing control unit 11.

The CPU 2 can dynamically change the allocation of memory capacity to each of the reading buffer memory 8, the printing buffer memory 10 and the image memory 13 in accordance with an operation mode, user settings, and the like of the image processing apparatus 1. The data conversion unit 9 executes various types of image processing, operations, such as image analysis and output image correction. The CPU 2 executes later-described printing adjustment processing and reading adjustment processing when causing the data conversion unit 9 to apply various types of image processing to image data stored in the image memory 13.

A display unit 14 is constituted by LEDs, an LCD, and the like, and can display operational statuses of the image processing apparatus 1 and the like under control by the CPU 2. An operation unit 15 is constituted by numeric keys and the like, and enables the user to perform various types of input operations. Hereinafter, the display unit 14 and the operation unit 15 will be collectively referred to as an operation panel 16. The operation panel 16 may be a touchscreen in which the display unit 14 and the operation unit 15 are integrated. An interface control unit 17 transmits and receives data to and from the external apparatus 19, such as a PC, via a network 18. A wired network or a wireless network may be used as the network 18. The network 18 may be replaced with a local interface. The image processing apparatus 1 can receive printing data generated by a printer driver for the image processing apparatus 1 installed in the external apparatus 19, and cause the printing mechanism 12 to print an image corresponding to the printing data. The image processing apparatus 1 can also receive a reading request signal from the scanner driver for the image processing apparatus 1 installed in the external apparatus 19, and cause the reading mechanism 7 to read the image on the original. Constituent elements 2 to 17 are included in the configuration of the image processing apparatus 1.

Figure 2:
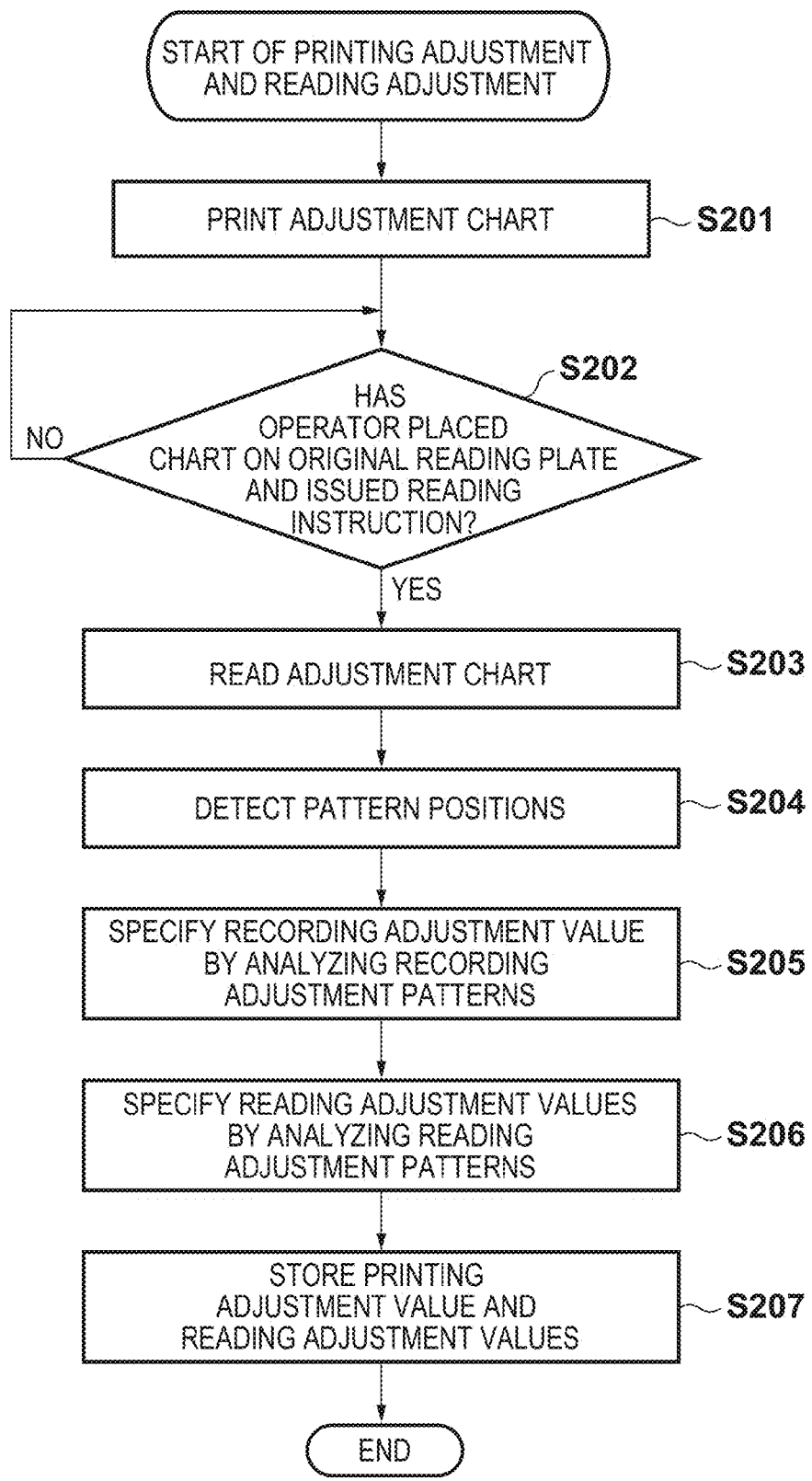
FIG. 2 shows a procedure of printing adjustment processing and reading adjustment processing.

FIG. 2 is a flowchart showing a procedure of the printing adjustment processing and reading adjustment processing in the image processing apparatus 1. The processing shown in FIG. 2 is executed, for example, by the CPU 2 in the image processing apparatus 1 executing a program stored in the program memory 4. When the user issues an instruction for the printing of an adjustment chart via the operation unit 15 or the external apparatus 19, the CPU 2 accepts the printing instruction from the user, and prints the adjustment chart (test chart) on a printing medium by controlling the printing mechanism 12 via the printing control unit 11 in step S201 (test printing). The adjustment chart includes a plurality of reading adjustment patterns and a plurality of printing adjustment patterns printed under different printing conditions, the details of which will be described later. When the adjustment chart has been printed, the CPU 2 may cause the display unit 14 to display navigation for setting the printing medium on which the adjustment chart has been printed on the original plate of the reading mechanism 7. At this time, for example, guidance indicative of the direction in which the printing medium should be set may be displayed as well.

In step S202, if the CPU 2 determines that an instruction for the reading of the adjustment chart has been issued via the operation unit 15 after the user set the adjustment chart printed in step S201 on the original plate of the reading mechanism 7, the processing moves to step S203. In step S203, the CPU 2 causes the reading mechanism 7 to read the adjustment chart set on the original plate via the reading control unit 6. The CPU 2 stores image data generated as a result of the reading in the reading buffer memory 8 of the data memory 5. The CPU 2 causes the data conversion unit 9 to apply image processing to the image data stored in the reading buffer memory 8, and stores the image data to which the image processing has been applied in the image memory 13.

Here, the reading mechanism 7 executes the reading, for example, in 8-bit grayscale at a reading resolution of 600 dpi. The CPU 2 also causes the data conversion unit 9 to apply scale-down processing involving, for example, bicubic interpolation to the image data at a reading resolution of 600 dpi stored in the reading buffer memory 8 so as to convert it into image data of 300 dpi, and stores the resultant image data in the image memory 13. Through the aforementioned process, in the case where the printing resolution is different from the reading resolution, unevenness in the interference with the read image attributed to the difference can be alleviated, and the storage capacity of the data memory 5 used to store the image data can be reduced.

In step S204, the CPU 2 detects positions of the patterns in the adjustment chart by analyzing the image data stored in the image memory 13. More specifically, positions of pattern images in the adjustment chart are detected, the pattern images being included in the image data acquired by reading the adjustment chart. In step S205, the CPU 2 specifies a printing adjustment value (printing adjustment parameter) by distinguishing and analyzing the printing adjustment patterns from the detected positions of the patterns. The printing adjustment value is used to adjust, for example, timings for driving the printing head of the printing mechanism 12. The analysis of the printing adjustment patterns will be described later with reference to FIGS. 5A and 5B. In step S206, the CPU 2 specifies reading adjustment values (reading adjustment parameters) by distinguishing and analyzing the reading adjustment patterns from the detected positions of the patterns. The reading adjustment values are reading correction values for correcting image data acquired by the reading mechanism 7 reading the image on the original, and are, for example, coefficients for applying transformation processing to the image read by the reading mechanism 7 (through the actual reading). The analysis of the reading adjustment patterns will be described later with reference to FIG. 6. In step S207, the CPU 2 stores the printing adjustment value specified in step S205 and the reading adjustment values specified in step S206 in a memory such as the data memory 5.

As described above, in the present embodiment, the printing adjustment value and the reading adjustment values can be acquired through a single reading using a single printed adjustment chart, thus achieving improved convenience for the user. Furthermore, as only a single printing medium is required to print the adjustment chart, printing media can be saved.

[Adjustment Chart]

Figure 3:
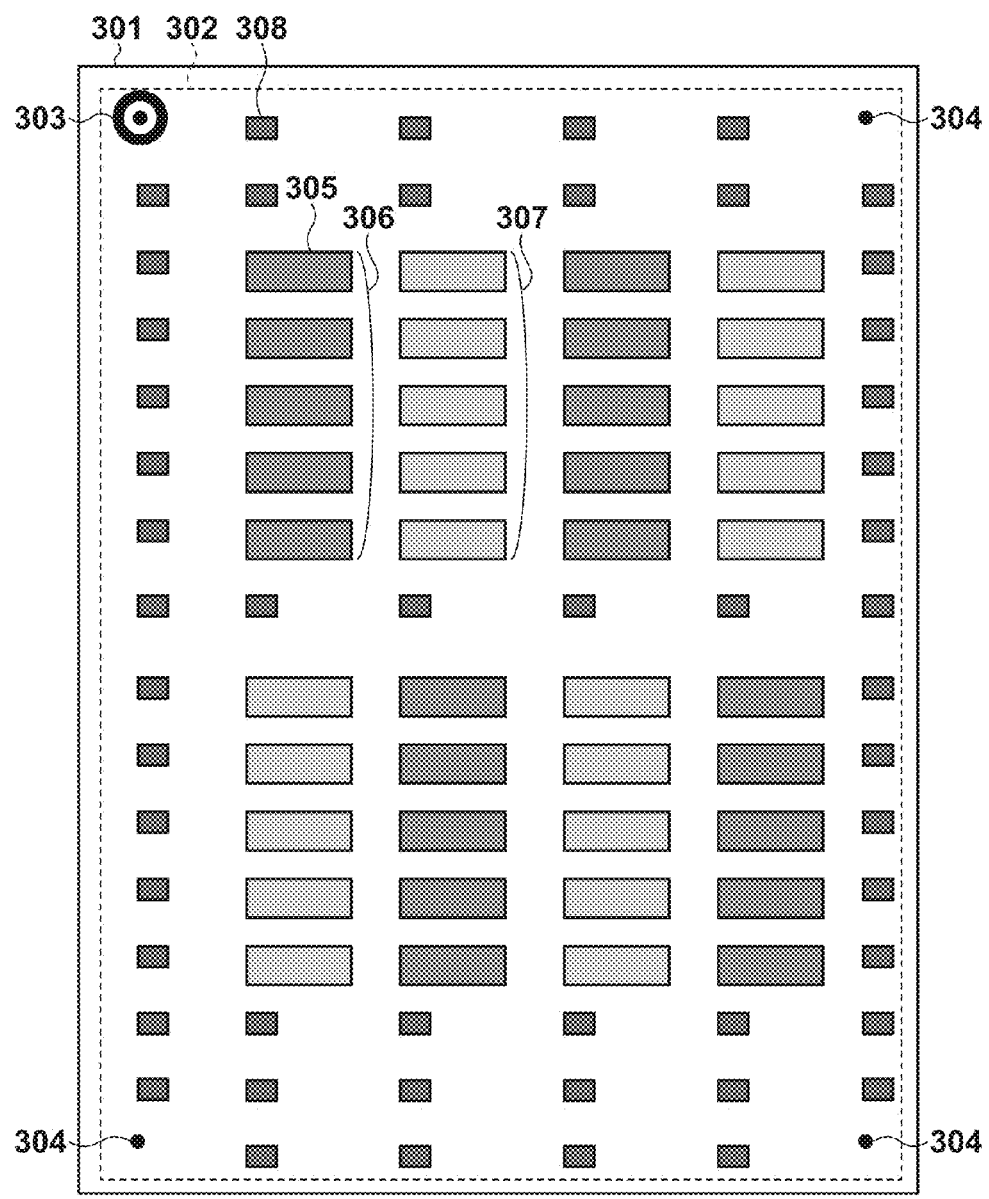
FIG. 3 shows one example of an adjustment chart.

FIG. 3 shows one example of an adjustment chart. An adjustment chart 301 is printed on a printing medium in step S201 of FIG. 2. An adjustment pattern region 302 in the adjustment chart 301 represents a region that includes all of the following patterns printed on the printing medium. Image data showing an image including marks and patterns in the adjustment pattern region 302 is prestored in the program memory 4, and serves as reference data for adjusting the reading and printing. A position detection mark 303 has a shape that is identical even when rotated, for example, a shape of concentric circles as shown in FIG. 3. A central position of the position detection mark 303 serves as a reference position for distinguishing printing adjustment patterns 305 (used in the reading adjustment as well) and reading adjustment patterns 308. The central position of the position detection mark 303 also serves as a reference position with respect to position detection marks 304.

The position detection marks 304 have a shape that is identical even when rotated, for example, a shape of a circle as shown in FIG. 3. As shown in FIG. 3, the position detection marks 304 are printed such that they are positionally aligned with the position detection mark 303 in the horizontal direction or the vertical direction, as can be seen from the marks at the upper right corner portion and the lower left corner portion of the adjustment pattern region 302. They may also be printed such that they are positioned diagonally across from the position detection mark 303, as can be seen from the mark at the lower right corner portion of the adjustment pattern region 302. With the position detection marks 304 printed in the above manner, a tilt of the adjustment pattern region 302 can be detected.

The printing adjustment patterns 305 vary depending on driving conditions of the printing mechanism 12. The driving conditions of the printing mechanism 12 are, for example, print timings in forward scanning and backward scanning of a serial-scanning printing head, designations of nozzle rows in the printing head (for example, predetermined one or two rows), and designations of a printing density. For example, in the case where a driving condition for reciprocal scanning is set, the printing adjustment patterns 305 are vertical stripe patterns in both forward scanning and backward scanning. A printing adjustment pattern group 306 includes, for example, five printing adjustment patterns 305 for which a driving condition has been changed in multiple steps. For these five patterns, ink discharge timings in the backward scanning are changed relative to those in the forward scanning at printing positions by +2 dots, +1 dot, 0 dots, -1 dot, and -2 dots in units of 1200 dpi. A driving condition of the printing mechanism 12 differs between the printing adjustment pattern group 306 and a printing adjustment pattern group 307. For example, the printing adjustment pattern group 307 is used to execute printing adjustment for the printing that utilizes two predetermined nozzle rows. These printing adjustment patterns are printed for each ink color or by mixing a plurality of inks. For example, various types of known patterns may be used as these printing adjustment patterns. The CPU 2 causes the reading mechanism 7 to read these patterns, and stores a printing density and a driving condition corresponding to a pattern that is closest to an ideal pattern in the data memory 5 as a printing adjustment value used in the actual printing. This printing adjustment value is used in registration adjustment for the printing by the printing mechanism 12.

The reading adjustment patterns 308 are used in correcting a reading scale factor and reading distortion, and are dispersed so as to be positioned across a wide range in the adjustment pattern region 302 together with the printing adjustment patterns 305. As shown in FIG. 3, the reading adjustment patterns 308 have a rectangular shape. Furthermore, the plurality of reading adjustment patterns 308 are printed in the vicinity of each of the four sides of the adjustment chart 301 and the adjustment pattern region 302. As shown in FIG. 3, two types of position detection marks, eight types of printing adjustment pattern groups, and one type of reading adjustment pattern are printed in the adjustment pattern region 302. In the example of FIG. 3, in the direction of long sides of the adjustment pattern region 302, the reading adjustment patterns 308 are printed at positions corresponding to different driving conditions for the printing adjustment patterns 305. On the other hand, in the direction of short sides thereof, the reading adjustment patterns 308 are printed at positions corresponding to the types of the printing adjustment patterns. Furthermore, the adjustment pattern region 302 may be printed, for example, on a back surface of the printing medium in addition to a front surface of the printing medium. In this case, reading adjustment values can be acquired through the reading of a double-sided original. The CPU 2 specifies the reading adjustment values in accordance with the positions of the aforementioned plurality of reading adjustment patterns 308 in the read image acquired by the reading mechanism 7 reading the adjustment pattern region 302, and transforms the read image using the reading adjustment values. Note that the read image can be corrected with high accuracy by printing a larger number of reading adjustment patterns 308 in the vicinity of the printing adjustment patterns 305 in addition to the vicinity of an outer periphery of the adjustment pattern region 302, as shown in the example of FIG. 3. In this way, the printing adjustment patterns 305 can be determined with high accuracy. As there is a high possibility that the reading by the reading mechanism 7 triggers distortion in the sub scanning direction, it is permissible to provide a small number of patterns (marks) in the main scanning direction (even one pattern (mark) suffices), and to provide a large number of (a plurality of) patterns (marks) in the sub scanning direction.

It will be assumed that the position detection marks 303 and 304 and the reading adjustment patterns 308 are stored in the program memory 4 as image data together with information showing the printing positions thereof. It will also be assumed that the printing adjustment patterns 305 are stored in the program memory 4 in correspondence with information showing the patterns and with information showing the printing densities, the driving conditions of the printing mechanism 12, and the printing positions. In order to print the adjustment chart 301, the foregoing image data and information are read from the program memory 4, and the image shown in FIG. 3 is printed on a single sheet.

[Processing for Determining Printing Adjustment Patterns]

Figure 4A:
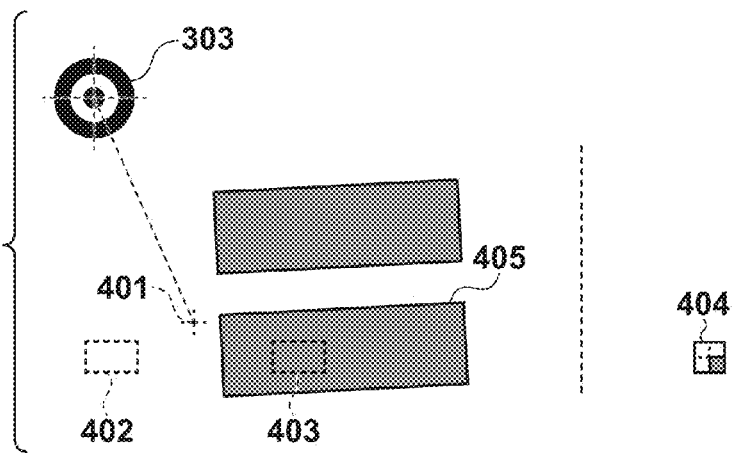
FIGS. 4A to 4C are diagrams for illustrating processing for detecting an analysis region for the printing adjustment processing.
Figure 4B:
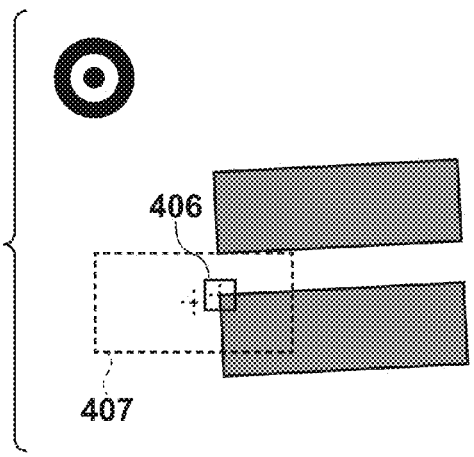
Figure 4C:
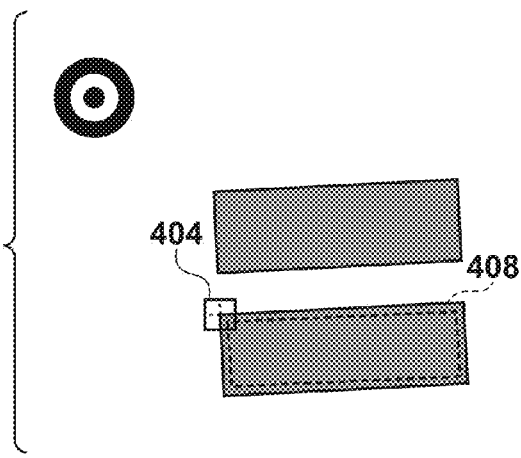

FIGS. 4A to 4C are diagrams for illustrating processing for distinguishing the printing adjustment patterns 305. The position of the position detection mark 303 is detected by pattern matching through one-dimensional raster scanning. For example, pixels in image data of a read image acquired by the reading mechanism 7 on a per-line basis are detected using binary data showing black and white, which is specified based on luminance values of the pixels and a reference threshold. That is to say, the position of the position detection mark 303, including its black circle at the center, can be detected when the acquired binary data showing black and white is determined to be a pattern "white, black, white, black, white, black, white" of a predetermined width. Furthermore, the central position of the position detection mark 303 can be detected accurately by obtaining a barycenter of the following two regions: a region located between the outermost black pixels in the detected region; and a closed region surrounded by the outermost black pixels in a region displaced from the foregoing region by several lines.

The positions of the position detection marks 304 are detected by analyzing regions that have been defined in advance based on the position of the position detection mark 303 detected ahead of time. That is to say, the positions of the position detection marks 304 can be detected by detecting black regions of a predetermined area or larger in predetermined regions in which the position detection marks 304 are supposed to exist in the directions of short sides, long sides, and a diagonal line of the adjustment pattern region 302 from the central position of the position detection mark 303 (in the vicinity of vertices thereof). Furthermore, the central positions of the position detection marks 304 can be detected accurately by obtaining a barycenter of predetermined regions including groups of black pixels corresponding to the detected position detection marks 304.

FIG. 4A shows the position detection mark 303 and a pattern 405 detected in step S204 of FIG. 2. In this figure, the pattern 405 corresponds to a printing adjustment pattern 305 or a reading adjustment pattern 308. A position 401 is a position defined by the position detection mark 303 and a distance from the position detection mark 303 to a printing adjustment pattern 305. The distance from the position detection mark 303 to a printing adjustment pattern 305 is defined at the time when data of the adjustment chart 301 has been generated. If there is an error in detection of the position of the position detection mark 303 and in the printing/reading of the same, the position 401 may not coincide with the position of the upper left corner of the printing adjustment pattern 305. FIG. 4A depicts such a case. A region 402 is used to obtain a sheet surface luminance value of a printing sheet (printing medium), and the position thereof has been defined in advance based on the position 401. The sheet surface luminance value is calculated by averaging luminance values of pixels acquired by the reading mechanism 7 reading the inside of the region 402, which is a margin portion of the adjustment chart 301 (a background color of the printing medium itself).

A region 403 is used to obtain a luminance value in the pattern 405 (pattern luminance value), and the position thereof has been defined in advance based on the position 401. The pattern luminance value is calculated by averaging luminance values of pixels in the region 403 included in the read image. A template image 404 is used in detecting a region that matches the same (template matching). The template image 404 is used to detect the position of the upper left corner of the pattern 405, and a pixel value of a lower right region out of regions acquired by dividing the template image 404 into four regions in the up-down and right-left directions from the center thereof is considered to be the pattern luminance value. On the other hand, pixel values in the remaining three regions in the template image 404 are considered to be the sheet surface luminance value. If the adjustment pattern region 302 is tilted, a template image is generated by rotating the template image 404 around the center thereof by the angle of that tilt, and the generated template image is used in the template matching.

FIG. 4B shows a search range 407 for the template matching using the template image 404. In the present embodiment, the template matching denotes processing for detecting a position at which the pattern matches by raster scanning the search range 407 using the template image 404. In the present embodiment, an SSD (sum of squared difference) method is used as a template matching method. Provided that the size of the template image 404 is M×N pixels, a pixel value at a template position (i, j) is T (i, j), and a pixel value of image data superimposed with the template image 404 is I (i, j), a difference R according to the SSD method is calculated as shown in Equation 1.

(Equation 1)

$$R = \sum_{j=0}^{N-1} \sum_{i=0}^{M-1} (I(i, j) - T(i, j))^2$$

The position of the template image 404 shown in FIG. 4B is a position where the difference R of Equation 1 is minimized, that is to say, a position where the template image 404 matches the most in the search range 407. When the template image 404 is thus positioned, the central position thereof coincides with the upper left corner portion of the pattern 405. In this way, the accurate position of the pattern 405 included in the read image can be detected based on the position where the difference R is minimized and on the central position of the template image 404. As the printing adjustment patterns 305 and the reading adjustment patterns 308 both have a rectangular shape, the positions thereof can be detected accurately by the aforementioned position detection method using template matching. FIG. 4C shows a region of a printing adjustment pattern 305 targeted for analysis. Once the accurate position of a printing adjustment pattern 305 has been detected using the method described above with reference to FIG. 4B, an analysis region 408 is determined as an analysis region of the printing adjustment pattern 305 as shown in FIG. 4C. The size of the analysis region 408 is defined based on, for example, the size of the printing adjustment pattern 305.

FIGS. 5A and 5B are diagrams for illustrating analysis of the printing adjustment patterns. For example, the printing adjustment pattern group 306 represents five test patterns that have been printed such that, in the printing adjustment for reciprocal scanning, ink discharge timings in the backward scanning are changed relative to ink discharge timings in the forward scanning by +2 dots, +1 dot, 0 dots, −1 dot, and −2 dots in units of 1200 dpi.

For a printing adjustment pattern 503 shown in FIG. 5A, a displacement amount of −1 dot is set as a driving condition. For a printing adjustment pattern 504, a displacement amount of 0 dots is set as a driving condition. For a printing adjustment pattern 505, a displacement amount of +1 dot is set as a driving condition. In the printing adjustment patterns 503 to 505, a pattern 501 represents a printed pattern in the forward scanning, and a pattern 502 represents a printed pattern in the backward scanning. If the printing for the reciprocal scanning has been executed accurately with the aforementioned displacement amounts, a read image of an analysis region 506 in the printing adjustment pattern 504 has the smallest luminance value, and the luminance value increases in accordance with the displacement amounts. The analysis region 506 is targeted for the analysis in step S205 of FIG. 2. While FIG. 5A shows displacement amounts of printing positions of printing dots in the reciprocal scanning as driving conditions, the pattern group may be printed by changing the printing densities of the printing adjustment patterns from one another. In this case, out of the printing adjustment patterns, a printing adjustment pattern whose luminance value in the read image shows the smallest difference from a predetermined luminance value corresponding to its printing density is specified, and the printing density of the specified printing adjustment pattern is determined as the optimal printing density and driving condition.

FIG. 5B is a diagram for illustrating processing for determining a printing adjustment value. In the present embodiment, statistical processing is applied to luminance values of pixels in the analysis regions 506 corresponding to the detected printing adjustment patterns. As a method for the statistical processing, calculation of an average value of pixel values in a predetermined region, extraction of high and low luminance values, calculation of variation, and the like may be used. In the present embodiment, it is assumed that the statistical processing is processing for calculating average luminance values in the analysis regions 506.

In the present embodiment, first, average luminance values of read images are calculated from the analysis regions 506 corresponding to the printing adjustment patterns 503 to 505.

In FIG. 5B, the average luminance values in the analysis regions 506 corresponding to the printing adjustment patterns 503 to 505 are plotted in correspondence with the displacement amounts. A luminance value 507 is an average luminance value in the analysis region 506 of the printing adjustment pattern 503. A luminance value 508 is an average luminance value in the analysis region 506 of the printing adjustment pattern 504. A luminance value 509 is an average luminance value in the analysis region 506 of the printing adjustment pattern 505. A graph 510 is an approximation function obtained based on the average luminance values of the printing adjustment patterns 503 to 505. Furthermore, in the present embodiment, the minimum 511 of the approximation function is obtained, and a displacement amount 512 corresponding to the minimum 511 is specified. This displacement amount serves as a printing adjustment value used at the time of actual printing. For example, if the displacement amount 512 is −0.3 dots, at the time of actual printing (printing based on normal printing data), the printing control unit 11 performs control to change an discharge timing relative to a reference discharge timing by −0.3 dots in accordance with the printing adjustment value. Changing an discharge timing relative to the reference discharge timing denotes delaying or advancing the discharge timing with respect to the reference discharge timing. Also, for example, in the case where the printing adjustment pattern groups are used in the adjustment of a printing density, an approximation function is obtained based on statistical values (average luminance values) in the analysis regions corresponding to the printing adjustment patterns in the printing adjustment pattern groups, and a printing density that is closest to a predetermined luminance value is used as a printing adjustment value. In this case, the printing control unit 11 changes a pixel value (density value) of printing data in accordance with the printing adjustment value at the time of actual printing.

The following describes processing for acquiring the reading adjustment values. FIG. 6 is a flowchart showing a schematic procedure of processing for analyzing the reading adjustment patterns. For example, the processing shown in FIG. 6 is executed by the CPU 2 in the image processing apparatus 1. In step S601, the CPU 2 detects a tilt of the adjustment chart 301 read in step S203 based on the positions of the position detection marks 303 and 304. Detection of the tilt will be described later with reference to FIG. 7C. In step S602, the CPU 2 specifies ideal positions of the patterns in the adjustment pattern region 302 in consideration of the tilt based on the position detection marks, on the tilt of the chart detected in step S601, and on the positions of the patterns. Specifying of the ideal positions of the patterns will be described later with reference to FIG. 7D. In step S603, the CPU 2 specifies ideal positions outside the adjustment pattern region 302 based on the ideal positions of the patterns specified in step S602. Specifying of the ideal positions outside the adjustment pattern region 302 will be described later with reference to FIG. 8.

In step S604, the CPU 2 specifies detected positions corresponding to the ideal positions outside the adjustment pattern region 302 based on the positions of the patterns in the adjustment pattern region 302, on the ideal positions of the patterns, and on the ideal positions outside the adjustment pattern region 302. Specifying of the detected positions outside the adjustment pattern region 302 will be described later with reference to FIG. 8. In step S605, the CPU 2 acquires reading adjustment values by detecting displacement amounts of the detected positions of the patterns specified in step S604 with respect to the ideal positions of the patterns specified in step S603, and stores the acquired reading adjustment values in the data memory 5. Detection of the displacement amounts will be described later with reference to FIG. 8. Acquisition of the reading adjustment values will be described later with reference to FIGS. 9A to 9C.

Figure 7A:
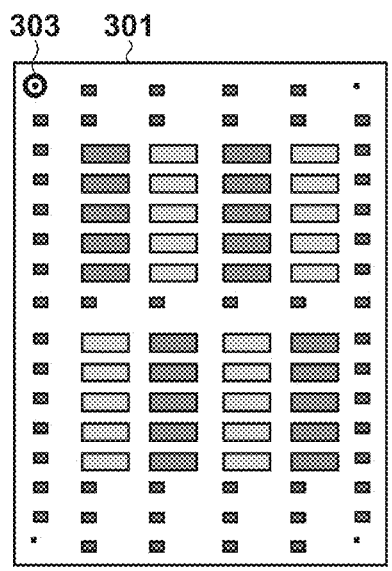
FIGS. 7A to 7D are diagrams for illustrating processing for detecting a tilt of the adjustment chart.
Figure 7B:
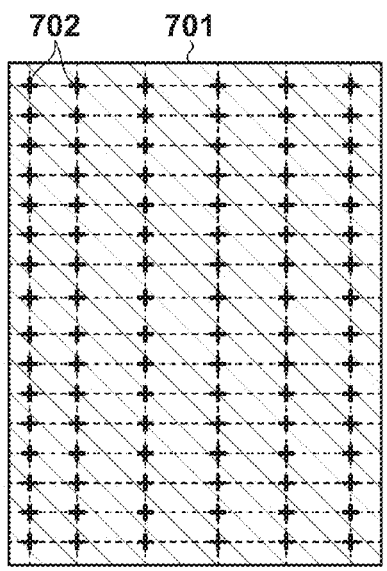
Figure 7C:
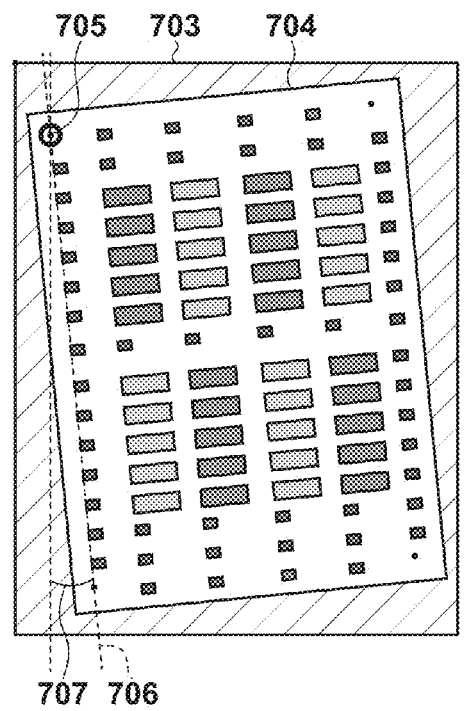

FIGS. 7A to 7D are diagrams for illustrating the detection of the tilt of the adjustment chart 301 and the specifying of the ideal positions of the patterns. FIG. 7A shows the adjustment chart 301 at a normal position. Data 701 in FIG. 7B shows positions of the patterns for the case where the adjustment chart 301 at the normal position has been printed on a printing medium. That is to say, this data shows the patterns for the case where, due to the adjustment chart 301 being correctly placed at a prescribed position, an image has been read by the reading mechanism 7 without any distortion and printed accordingly. Positions 702 indicate the positions of the patterns using a sign "+". For example, the centers of the positions 702 correspond to the positions of the upper left corners (vertices) of the printing adjustment patterns 305 and the reading adjustment patterns 308, and to the central positions of the position detection marks 303 and 304. It will be assumed that the data 701 is prestored in the program memory 4 together with information for specifying coordinates of the plurality of positions 702. FIG. 7C shows one example of a result of reading the adjustment chart 301 in step S203 of FIG. 2. Read data 703 has been acquired by the reading mechanism 7 reading a region on the original plate that has been defined in advance. The region of the read data 703 corresponds at least to a rectangular region including a region in which an original exists (the horizontal direction and the vertical direction are parallel to the main scanning direction and the sub scanning direction of the reading mechanism 7, respectively). The region in which the original exists is specified by detecting the outer peripheral edges of the original. Read data 704 shows a part of the read data 703 that corresponds to the adjustment chart 301 (original).

A description is now provided of the detection of the tilt of the adjustment chart 301 in step S601 of FIG. 6. As shown in FIG. 7C, if the adjustment chart 301 placed on the original plate by the user is tilted with respect to a prescribed position, the read data 704 is tilted by a certain angle with respect to the normal position shown in FIG. 7A. This tilt θ is calculated from coordinates (x, y) of a position detection mark 705 and coordinates (x', y') of a position detection mark 706 in the read data 704 as shown in Equation 2.

$$\theta = \arctan((y'-y)/(x'-x)) \quad \text{(Equation 2)}$$

This tilt θ corresponds to a tilt angle 707 shown in FIG. 7C.

Figure 7D:
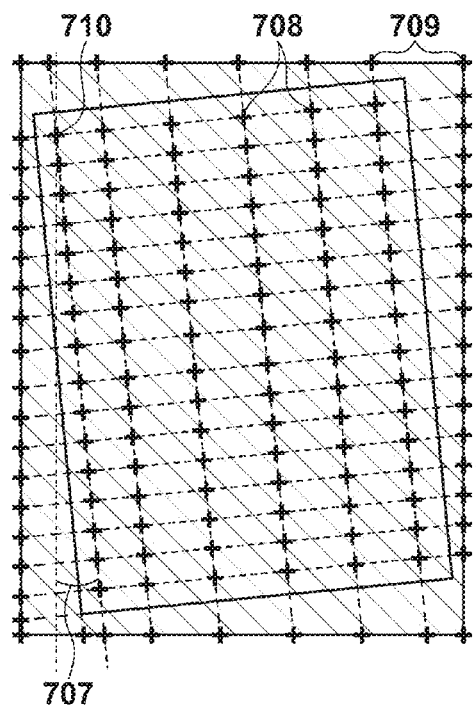

FIG. 7D is a diagram for illustrating the specifying of the ideal positions of the patterns. The ideal positions of the patterns are specified by adjusting a position 702 corresponding to the position detection mark 303 to coincide with the position of the position detection mark 705, translating other positions 702 accordingly, and rotating the data 701 by the tilt θ calculated using Equation 2. Provided that coordinates of the position detection mark 705 are $(x_0, y_0)$ and coordinates of the positions 702 are (x, y), coordinates (x', y') of ideal positions 708 after the translation and rotation are calculated as shown in Equation 3.

$$x' = (x \cos \theta) - (y \sin \theta) + x_0$$

$$y' = (x \sin \theta) - (y \cos \theta) + y_0 \quad \text{(Equation 3)}$$

That is to say, the ideal positions 708 shown in FIG. 7D represent ideal positions of the patterns in the adjustment pattern region 302 for the case where the adjustment chart 301 has been read with the tilt θ. Due to a reading error of the image sensors in the reading mechanism 7 and the like, the read image may actually be tilted, causing the read image to be displaced with respect to the ideal positions 708. In the present embodiment, the CPU 2 acquires the reading adjustment values based on such displacement amounts, as will be described later with reference to FIG. 8. Positions 709 shown in FIG. 7D represent the ideal positions outside the adjustment pattern region 302 specified based on the ideal positions 708. Specifying of the positions 709 will be described later with reference to FIG. 8.

Figure 8:
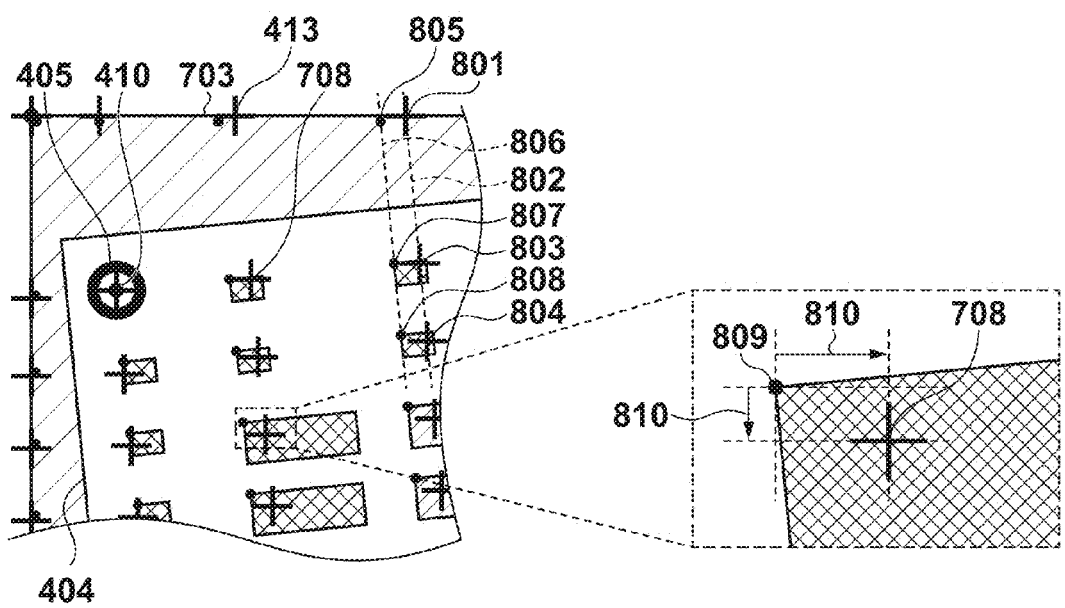
FIG. 8 is a diagram for describing a displacement amount of a read image with respect to an ideal position.

FIG. 8 is a diagram for illustrating the detection of displacement amounts for acquiring the reading adjustment values. In FIG. 8, the ideal positions 708 are shown together with the read data 703 read in step S203 of FIG. 2. In FIG. 8, a line segment 802 connects the ideal positions 708 in the horizontal direction or the vertical direction on the adjustment chart 301 at the normal position. More specifically, the line segment 802 shown in FIG. 8 connects ideal positions 803 and 804 in the foregoing vertical direction. A point at which this line segment 802 intersects the upper edge of the read data 703 is an ideal position 801. Provided that coordinates of the ideal position 803 are $(x_a, y_a)$ and coordinates of the ideal position 804 are $(x_b, y_b)$, a linear function represented by the line segment 802 is expressed by Equation 4.

$$y = a_x + b = x(y_b - y_a)/(x_b - x_a) + (x_b y_a - x_a y_b)/(x_b - x_a) \quad \text{(Equation 4)}$$

The CPU 2 specifies the ideal position 801 outside the adjustment pattern region 302 based on Equation 4. The ideal position 801 corresponds to the ideal positions 709 shown in FIG. 7D. For example, the ideal position 801 located on the upper edge of the read data 703 is obtained by calculating x under the assumption that y=the y-coordinate of the upper edge. The ideal position 801 located on the lower edge of the read data 703 is obtained by calculating x under the assumption that y=the y-coordinate of the lower edge. The ideal position 801 located on the left edge of the read data 703 is obtained by calculating y under the assumption that x=the x-coordinate of the left edge. The ideal position 801 located on the right edge of the read data 703 is obtained by calculating y under the assumption that x=the x-coordinate of the right edge.

Next, a description is provided of the specifying of detected positions corresponding to the ideal positions outside the adjustment pattern region 302 in step S604 of FIG. 6. Detected positions 807 and 808 represent positions of the upper left corners of parts of the read data 703 that correspond to the reading adjustment patterns 308. A line segment 806 connects the detected positions 807 and 808 in the aforementioned vertical direction, similarly to the line segment 802. Provided that coordinates of the detected position 807 are $(x_a, y_a)$ and coordinates of the detected position 808 are $(x_b, y_b)$, a linear function represented by the line segment 806 is expressed in a manner similar to the case of the line segment 802. In FIG. 8, the detected positions 807 and 808 correspond to the ideal positions 803 and 804, respectively.

The CPU 2 specifies a detected position 805 outside the adjustment pattern region 302 based on Equation 4 and on a ratio of distances between the ideal positions 801, 803 and 804. It will be assumed that coordinates of the ideal positions 801, 803 and 804 are (x801, y801), (x803, y803) and (x804, y804), respectively. It will also be assumed that coordinates of the detected positions 805, 807 and 808 are (x805, y805), (x807, y807) and (x808, y808), respectively. A relationship between a ratio of distances between the ideal positions and a ratio of distances between the corresponding detected positions is obtained using Equation 5.

$$\sqrt{(x_{801}-x_{803})^2 + (y_{801}-y_{803})^2} : \sqrt{(x_{803}-x_{804})^2 + (y_{803}-y_{804})^2} = \sqrt{(x_{805}-x_{807})^2 + (y_{805}-y_{807})^2} : \sqrt{(x_{807}-x_{808})^2 + (y_{807}-y_{808})^2} \quad \text{(Equation 5)}$$

Coordinates (x805, y805) on the linear function 806 that satisfy Equation 5 serve as the detected position 805 outside the adjustment pattern region 302.

The following describes the detection of displacement amounts in step S605 of FIG. 6. In FIG. 8, a detected position 809 represents a detected position of a pattern detected in step S204 of FIG. 2. The ideal position 708 is specified in step S602 of FIG. 6. In FIG. 8, a displacement amount of the detected position 809 with respect to the ideal position 708 is indicated as a difference 810. Such a displacement amount is obtained for the printing adjustment patterns, the reading adjustment patterns and the position detection marks in the adjustment pattern region 302, and for the ideal positions and the detected positions outside the adjustment pattern region 302. By thus obtaining displacement amounts, coordinates of detected positions corresponding to coordinates of ideal positions can be calculated.

FIGS. 9A to 9C are diagrams for illustrating the reading adjustment values. In the present embodiment, image correction using the three-point affine transformation is applied to read image data. That is to say, in the present embodiment, the reading adjustment values are parameters specified by a transformation equation of the three-point affine transformation.

FIG. 9A shows regions divided into triangles based on the detected positions of the patterns specified in step S204 of FIG. 2 and step S604 of FIG. 6. The numbers 1 to 6 shown in FIG. 9A indicate the regions divided into the triangles. Hereinafter, the regions detected from the read image shown in FIG. 9A are referred to as detected triangles (the results of forming (connecting) the detected triangles for the entirety of the read data may be referred to as measurement grids). Regions shown in FIG. 9B are referred to as ideal triangles. The detected triangles correspond to the ideal triangles shown in FIG. 9B. Each detected triangle has the following vertices: a point of tangency between a line segment connecting a detected mark/pattern in the vertical/horizontal direction and a side of the read data; a vertex of the read data; and a position of a pattern. Any of the position detection marks 303 and 304, the printing adjustment patterns 305 and the reading adjustment patterns 308 serves as the foregoing mark/pattern. For example, when forming the triangles, central points of circular marks and upper left vertices of quadrilateral patterns are connected; however, the positions of the vertices may be any position in the marks and patterns. FIG. 9B shows regions that have been divided into triangles based on the ideal positions of the patterns specified in steps S202 and S203 of FIG. 6. The regions shown in FIG. 9B are determined based on displacement amounts with respect to the ideal positions, as has been described with reference to FIGS. 7A to 7D. The numbers 1 to 6 shown in FIG. 9B indicate the regions divided into the triangles. As the entirety of the read data is divided into triangles, a triangle 7 and subsequent triangles also exist; however, a description thereof is omitted herein. The results of forming (connecting) the ideal triangles for the entirety of the read data may be referred to as ideal grids. The ideal triangles correspond to the detected triangles shown in FIG. 9A.

FIG. 9C shows coordinates of the vertices of the ideal triangles (the upper left vertex of the read data serves as the origin) and parameters of the reading adjustment values. These reading adjustment values represent parameters for adjusting the read data such that the measurement grids match or approximate the ideal grids. In FIG. 9C, numbers 1 to 6 indicate the ideal triangles shown in FIG. 9B (number 7 and subsequent numbers are omitted therein). Coordinates of the vertices of the ideal triangle 1 are set as shown in FIG. 9B. For each of the ideal triangle 2 and subsequent ideal triangles, it will be hereinafter assumed that the vertex that is closest to the upper edge and the left side of the read data is (x1, y1), the vertex therebelow is (x2, y2), and the remaining vertex is (x3, y3). The affine transformation equation used in the image correction is expressed by Equation 6.

$$\begin{pmatrix} x_{src} \\ x_{src} \end{pmatrix} = a \begin{pmatrix} x'_{dst} \\ y'_{dst} \end{pmatrix} + t \quad \text{(Equation 6)}$$

$$a = \begin{pmatrix} a_{11} a_{12} \\ a_{21} a_{22} \end{pmatrix}$$

$$t = \begin{pmatrix} t_x \\ t_y \end{pmatrix}$$

As shown in Equation 6, the affine transformation equation is used to obtain an input pixel position ($x_{src}$, $y_{src}$) from an output pixel position ($x_{dst}$, $y_{dst}$) corresponding to a vertex of a triangle. In the present embodiment, the reading adjustment values are matrices a and t in Equation 6, which are parameters of the affine transformation equation. The matrices a and t in the affine transformation are determined based on coordinate values of three vertices of an ideal triangle and on coordinate values of three vertices of a detected triangle. Furthermore, as the matrices a and t vary with each triangle region, the reading adjustment values (matrices a and t) are stored and managed in the data memory 5 and the like in association with coordinates (x1, y1), (x2, y2) and (x3, y3) of the vertices of the ideal triangles as shown in FIG. 9C. Note that pixel positions of pixels in one triangle are corrected in accordance with the same reading adjustment value. While the present embodiment has described the case where coordinates are transformed using the three-point affine transformation as image correction, a coordinate transformation method other than the three-point affine transformation may be used. For example, a planar projective transformation, a Helmert transformation, a pseudo affine transformation, and the like may be used. Any method may be used as long as it can determine an adjustment value for each of a plurality of small regions divided in the vertical and horizontal directions using the patterns as references.

FIG. 10 is a flowchart showing a procedure of processing for correcting a read image. For example, the processing shown in FIG. 10 is executed by the CPU 2 in the image processing apparatus 1. In step S1001, the CPU 2 reads an original (adjustment chart 301) that the user has placed on the original plate by controlling the reading mechanism 7 via the reading control unit 6. Read image data is stored in the reading buffer memory 8 of the data memory 5. In parallel with the reading operation, the data conversion unit 9 applies image processing to the image data stored in the reading buffer memory 8 and stores the resultant image data in the image memory 13. Processes of steps S1002 to S1006 are executed in parallel with the process of step S1001.

In step S1002, the CPU 2 determines whether or not the image correction for the read image has been completed. The CPU 2 makes the determination of step S1002 based on whether or not all of the pixels in an output image have been targeted for the image correction. Note that the output image denotes image data stored in an image buffer secured in the image memory 13. If all of the pixels in the output image have been targeted for the image correction, the present processing shown in FIG. 10 is ended; on the other hand, if all of the pixels have not been targeted for the image correction yet, processes of steps S1003 to S1006 are executed for target pixels, that is to say, pixels in the output image that have not been targeted for the image correction yet.

In step S1003, the CPU 2 specifies an ideal triangle that includes a target pixel and has three ideal positions as vertices. The CPU 2 specifies the ideal triangle that includes the target pixel based on three points indicated by the coordinates of the vertices of the ideal triangles shown in FIG. 9C. In step S1004, the CPU 2 specifies an input pixel position in the read image from the position of the target pixel in the output image based on the matrices a and t in the three-point affine transformation equation corresponding to the ideal triangle specified in step S1004. Note that the matrices a and t are obtained for each triangle. In step S1005, the CPU 2 obtains a pixel value of the input pixel position in the read image, and uses the obtained pixel value as a pixel value in the output image (output pixel value). The process of step S1005 will be described later with reference to FIGS. 11A and 11B. In step S1006, the CPU 2 determines the output pixel value obtained in step S1005 as a pixel value corresponding to the target pixel in the output image in the image memory 13. Through the above processes, input pixels in the read image are changed to corrected positions according to the adjustment values corresponding to positions in the read image, and then output as output pixels.

Figure 11A:
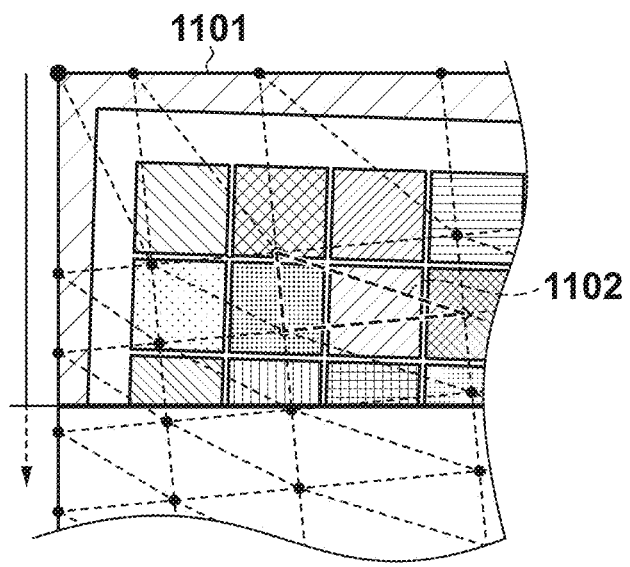
FIGS. 11A and 11B are diagrams for illustrating correction of a read image in steps S1003 to S1005.
Figure 11B:
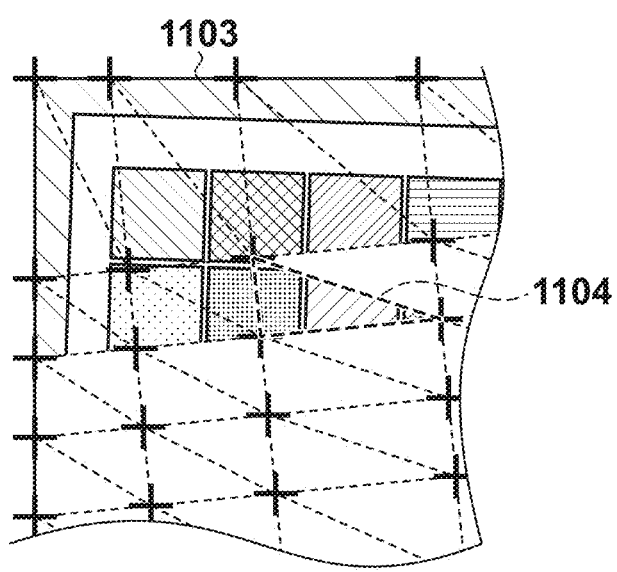

FIGS. 11A and 11B are diagrams for illustrating the image correction through the three-point affine transformation in steps S1003 to S1005 of FIG. 10. An input image 1101 is read in step S1001 of FIG. 10. An output image 1103 is the result of applying image correction to the input image 1101 through the affine transformation. For example, pixel values in a region 1104 in the output image 1103 are determined from pixel values in a region 1102 in the input image 1101.

In the three-point affine transformation executed in the processes of steps S1003 to S1005 in FIG. 10, coordinate values in the read image are calculated from coordinate values of target pixels in the output image based on the matrices a and t in the affine transformation equation. Pixel values corresponding to the calculated coordinate values are determined as output pixel values. In the present embodiment, pixel values are calculated by applying three-dimensional interpolation (bicubic interpolation) to pixel values of 16 pixels located in the vicinity of the coordinate values in the input image. However, the present embodiment is not limited in this way, and linear interpolation (bilinear interpolation), spline interpolation, and the like may be used as a resampling method. Alternatively, pixel values may be calculated using a nearest-neighbor method. Once adjustment values have been determined in the above-described correction of the read image, the determined adjustment values are stored in the data memory 5 and used also in reading an image other than the adjustment chart.

As described above, in the present embodiment, the adjustment chart that has been read for correction of the reading processing of the reading mechanism 7 is divided into a plurality of two-dimensional regions, and two-dimensional geometric correction is applied to the read image such that the divided regions coincide with the corresponding ideal positions. Therefore, distortion of the read image can be corrected with high accuracy. Furthermore, based on the result of reading the printed adjustment chart, both of the printing adjustment value and the reading adjustment values can be acquired through single reading, thus achieving improved convenience for the user. Moreover, as the same printing medium (original) is used for both of the printing adjustment and the reading adjustment, printing mediums can be saved.

[Second Embodiment]

The first embodiment has described a method for applying geometric correction to a read image using the affine transformation and the like in order to correct distortion of the read image. In the second embodiment, image correction is executed by controlling the reading mechanism 7. More specifically, a read timing for a reading operation of the reading mechanism 7 is controlled so as to adjust an overall scale factor and a partial scale factor in the main scanning direction or the sub scanning direction, and hence to reduce distortion of a read image. In the present embodiment, a partial scale factor in the main scanning direction is corrected by image correction, and a partial scale factor in the sub scanning direction is corrected by controlling a read timing for the reading operation. The following describes difference from the first embodiment, that is to say, acquisition of reading adjustment values and reduction in distortion of a read image using the reading adjustment values in the present embodiment.

FIGS. 12A to 12F are diagrams for illustrating the reading adjustment values according to the present embodiment. FIG. 12A shows detected positions of marks and patterns in the adjustment chart 301 included in a read image in the main scanning direction and the sub scanning direction. Detected positions 1201 in the main scanning direction are outside the adjustment pattern region 302 and specified using the method that has been described in the first embodiment with reference to FIG. 8. Detected positions 702 in the sub scanning direction are also specified using the method that has been described in the first embodiment with reference to FIG. 8.

FIG. 12B shows ideal positions in the main scanning direction and the sub scanning direction. Ideal positions 1203 in the main scanning direction, which are labeled x1 to x6, are outside the adjustment pattern region 302 and specified using the method that has been described in the first embodiment with reference to FIG. 8. Ideal positions 1204 in the sub scanning direction, which are labeled y1 to y16, are also specified using the method that has been described in the first embodiment with reference to FIG. 8.

FIG. 12C shows comparison between the detected positions and the ideal positions in the main scanning direction. In FIG. 12C, 0 to 6 indicate regions for which the partial scale factor is to be corrected. These regions have been divided based on the ideal positions x1 to x6. In each region, the partial scale factor is corrected for image data (line data) corresponding to one line in the main scanning direction through scaling processing. Note that the scale factor for the scaling processing is determined from the interval of the ideal positions and the interval of the detected positions. For example, the scale factor of the region 1 is obtained by (x2−x1)/(detected position corresponding to x2−detected position corresponding to x1). In the present embodiment, this scale factor serves as a reading adjustment value in the main scanning direction. In the reading correction for the main scanning direction, an input pixel position corresponding to an output pixel position is calculated from the foregoing scale factor, and an input pixel value of the calculated position is determined as an output pixel value in an output image. Instead of executing the adjustment by changing the scale factor, other methods may be used; for example, the main scan timing may be adjusted on a per-pixel basis.

FIG. 12D shows comparison between the detected positions and the ideal positions in the sub scanning direction. In FIG. 12D, 0 to 16 indicate regions for which the partial scale factor is to be corrected. These regions have been divided based on the ideal positions y1 to y16. Image correction for the sub scanning direction is executed by controlling a synchronization timing for the reading operation of the reading mechanism 7. More specifically, the read timing is adjusted for each region in the sub scanning direction. Note that the read timing for the reading operation denotes an interval at which each line data is read. In the present embodiment, scaling processing for the sub scanning direction is executed by adjusting the interval at which each line data is read by multiplying the read timings for the reading operation for which the reading adjustment values have been obtained by the scale factors. The scale factors are determined from the interval of the ideal positions and the interval of the detected positions. For example, the scale factor for the region 1 is obtained by (y2−y1)/(detected position corresponding to y2−detected position corresponding to y1). Instead of adjusting the interval at which each line data is read, the moving speed of the reading mechanism 7 may be variably controlled on a per-line basis.

FIG. 12E shows the reading adjustment values in the main scanning direction. In FIG. 12E, $x_s$ and $x_e$ respectively denote start positions and end positions of the regions that are divided based on the ideal positions x1 to x6 in the main scanning direction. Also, $a_x$ denotes the scale factor for scaling processing for each region, and $t_x$ denotes a start position (input pixel position) of each region after the scaling processing.

A description is now provided of a method for calculating an input pixel position ($x_{src}$) from an output pixel position ($x_{dst}$). First, a regions corresponding to the output pixel position is specified based on $x_s$ and $x_e$, and a scale factor $a_x$ and a start position $t_x$ corresponding to this region are determined. Next, the input pixel position is calculated from Equation 7.

$$x_{src}=(x_{dst}-X_s)a_x+t_x \qquad \text{(Equation 7)}$$

The CPU 2 determines a pixel value of the input pixel position calculated from Equation 7 as an output pixel value in the output image.

FIG. 12F shows the reading adjustment values in the sub scanning direction. In FIG. 12F, ys and ye respectively denote start positions and end positions of the regions that are divided based on the ideal positions y1 to y6 in the sub scanning direction. Also, ay denotes scale factors for adjusting a read timing for reading each line data with respect to a default read timing, and is determined based on ys and ye.

Figure 13A:
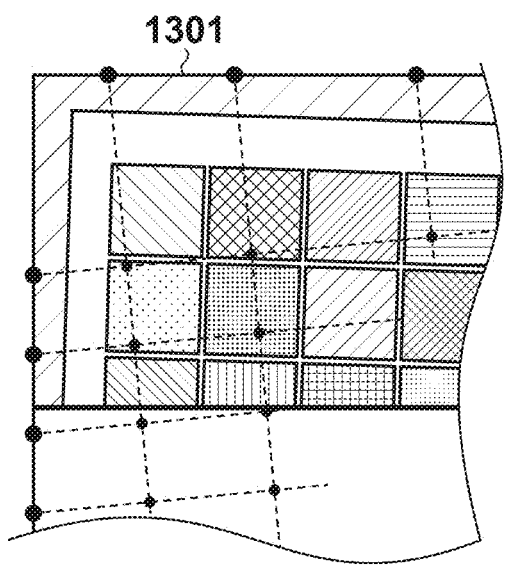
FIGS. 13A and 13B are diagrams for illustrating correction of a read image according to the second embodiment.
Figure 13B:
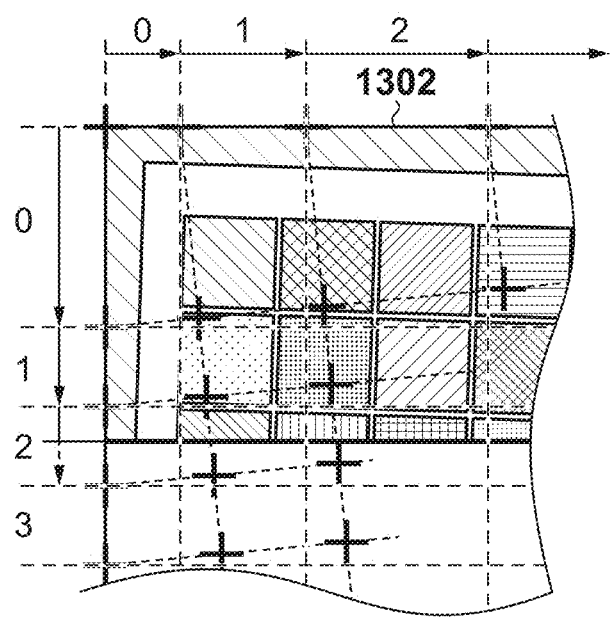

FIGS. 13A and 13B are diagrams for illustrating processing for applying image correction to image data in the main scanning direction by scaling. An input image 1301 is a read image and stored in the reading buffer memory 8 of the data memory 5. For the input image 1301, the read timing of the reading mechanism 7 in the sub scanning direction has been adjusted for each reading position as described above. An output image 1302 is obtained by the data conversion unit 9 applying image correction to the input image 1301 and stored in the image memory 13.

In FIG. 13B, 0, 1, 2, . . . indicate regions that have been divided in the main scanning direction and the sub scanning direction. In the present embodiment, scaling for the sub scanning direction is executed by adjusting the read timing for the reading operation for each line data. Therefore, for the sub scanning direction, it is not necessary to execute image correction that is executed for the main scanning direction; in other words, upon acquisition of the input image 1301 (that is to say, upon completion of the reading operation), image correction for the sub scanning direction is completed. On the other hand, scaling for the main scanning direction is executed by image correction; therefore, image correction is applied to the input image 1301. In the image correction, an output pixel value in the output image is determined based on the method that has been described with reference to FIGS. 12A to 12F, that is to say, the method for calculating an input pixel position from correction values for the main scanning direction and an output pixel position.

As described above, the CPU 2 determines scale factors for the main scanning direction (horizontal direction) and the sub scanning direction (vertical direction) similarly to the flow of FIG. 6. The CPU 2 also causes the reading control unit 6 to control scaling for the main scanning direction and read timings for the sub scanning direction in accordance with the scale factor obtained for each reading position, in place of the geometric correction (affine transformation) in the flow of FIG. 10. In this way, the reading mechanism 7 can be controlled variably for each reading position, and the achieved result is substantially equivalent to the result achieved in the first embodiment.

[Third Embodiment]

In the present embodiment, in the case where the reading control unit 6 can set one of a plurality of reading conditions and cause the reading mechanism 7 to operate accordingly, reading adjustment values are obtained in correspondence with the plurality of reading conditions. The reading conditions are, for example, control settings for image sensors (for example, light-emitting and light-receiving control), main-scan resolutions, sub-scan resolutions associated with control on movements of the optical system and the original, information of read colors (color, gray scale, and the like), the moving speed of the optical system, and the conveyance speed of the original. Some of these reading conditions correspond to driving conditions in which the reading control unit 6 causes the reading mechanism 7 to operate. In a reading operation, driving accuracies of driving systems may vary depending on a driving condition, such as the moving speed of the optical system and the conveyance speed of the original. For this reason, distortion of a read image varies with each reading condition. Therefore, reading adjustment values are determined for each of the aforementioned reading conditions. In order to deal with each of the plurality of settable reading conditions, it is sufficient to specify reading adjustment values in correspondence with all of the reading conditions by reading and analyzing an adjustment chart for each of the plurality of reading conditions. This, however, increases labor and is therefore troublesome. In view of this, in the present embodiment, the aforementioned labor is reduced by generating reading adjustment values corresponding to reading conditions that have not been acquired yet based on reading adjustment values that have already been acquired.

Figure 14:
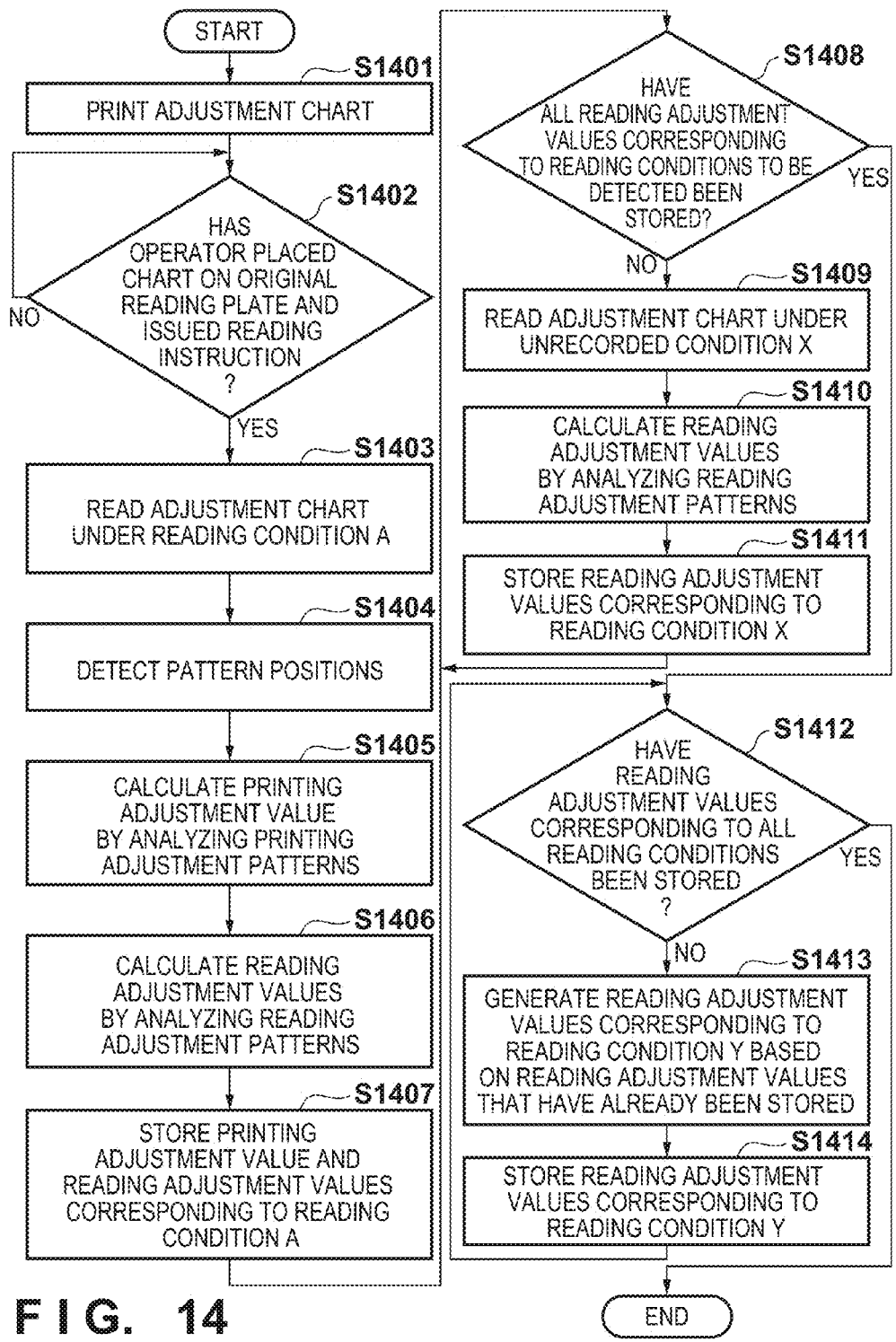
FIG. 14 shows a procedure of processing for acquiring reading adjustment values according to a third embodiment.

FIG. 14 is a flowchart showing a procedure of processing for acquiring a printing adjustment value and reading adjustment values in the present embodiment. For example, the processing shown in FIG. 14 is executed by the CPU 2 in the image processing apparatus 1. Processes of steps S1401 to S1407 are the same as processes of steps S201 to S207 in FIG. 2. For example, in step S1403, an image of an adjustment chart is read under a reading condition A with 8-bit grayscale and 600 dpi, and reading adjustment values corresponding to the reading condition A are detected and stored in a storage area such as the data memory 5. It will be assumed that the following reading conditions have been determined in advance: reading conditions for which reading adjustment values are calculated and acquired by actually reading the adjustment chart; and reading conditions corresponding to reading adjustment values that are generated based on reading adjustment values that have already been acquired.

In step S1408, the CPU 2 determines whether or not all of the reading adjustment values corresponding to reading conditions that should be acquired by actually reading the adjustment chart have already been acquired. The processing moves to step S1412 if it has been determined that all of such reading adjustment values have already been acquired, and to step S1409 if it has been determined that all of such reading adjustment values have not been acquired yet. In step S1409, the CPU 2 instructs the reading control unit 6 to read the adjustment chart under a reading condition X that has not been acquired yet (X is a variable). For example, if reading adjustment values corresponding to a reading condition X with 8-bit grayscale and 150 dpi have not been acquired yet, the image is read under this reading condition X. At this time, as the adjustment chart has been placed on the original plate, reading is automatically started under the reading condition X. Here, it is permissible to display, on the display unit 14, guidance requesting an instruction for starting the reading from the operation unit 15 after placing the adjustment chart, and to execute the reading under the reading condition X upon issuance of the instruction for starting the reading. In step S1410, the CPU 2 acquires reading adjustment values by analyzing the adjustment pattern region 302 in read data acquired by reading the adjustment chart 301 under the reading condition X. Note that these reading adjustment values correspond to a reading condition that is different from the reading condition associated with step S1406. In step S1411, the CPU 2 stores the acquired reading adjustment values in a storage area such as the data memory 5 in correspondence with the reading condition X, and returns to step S1408. The reading condition X in step S1409 varies with each loop starting with step S1408.

In step S1412, the CPU 2 determines whether or not reading adjustment values corresponding to all of the reading conditions that should be acquired have already been acquired. The present processing shown in FIG. 14 is ended if it has been determined that the reading adjustment values have already been acquired, and moves to step S1413 if it has been determined that the reading adjustment values have not been acquired yet. In step S1413, the CPU 2 generates reading adjustment values corresponding to a reading condition Y that has not been acquired yet (Y is a variable). Note that the reading condition Y is a reading condition that is other than the reading conditions A and X and newly generated based on reading adjustment values corresponding to the reading conditions that have already been acquired. For example, it will be assumed that reading adjustment values corresponding to the reading condition Y with 8-bit grayscale and 300 dpi have not been acquired yet. In step S1413, from among the reading conditions that have already been acquired, a reading condition of a read driving system most similar to the reading condition that has not been acquired yet and is hence to be generated is selected. For example, the aforementioned reading condition X with 8-bit grayscale and 150 dpi is selectable as a similar reading condition as it has the same information of read colors and a reading resolution of ½. Then, reading adjustment values corresponding to the selected reading condition are used as reading adjustment values corresponding to the reading condition that has not been acquired yet and is hence to be generated. Alternatively, a plurality of reading conditions similar to the reading condition that has not been acquired yet and is hence to be generated may be selected from among the reading conditions that have already been acquired, and new reading adjustment values may be calculated based on a plurality of reading adjustment values corresponding to the plurality of reading conditions.

For example, it will be assumed that the moving speed of the optical system corresponding to a reading condition for which reading adjustment values should be generated is Sc [inch/sec]. It will be also assumed that reading conditions corresponding to the reading adjustment values that have already been acquired show Sa [inch/sec] and Sb [inch/sec], and the reading adjustment values therefor are Ca and Cb, respectively. In this case, reading adjustment values Cc to be generated are calculated from Equation 8. In Equation 8, the reading condition corresponding to the reading adjustment values to be generated is applied to a linear equation derived based on the two reading conditions and their respective reading adjustment values that have already been acquired.

$$Cc=(Ca-Cb)(Sc-Sa)/(Sa-Sb)+Ca \quad \text{(Equation 8)}$$

In step S1414, the CPU 2 stores the generated reading adjustment values in the storage area in correspondence with the reading condition. As described above, as reading adjustment values corresponding to a reading condition that has not been acquired yet are generated based on reading adjustment values that have already been acquired, the user's labor can be reduced and improved convenience can be achieved.

In the above description, reading adjustment values for some reading conditions are specified based on the result of actual measurement, and reading adjustment values for other reading conditions are newly generated from the reading adjustment values based on the result of actual measurement. However, all of the necessary reading adjustment values may be specified by actual measurement. Here, reading adjustment values may be specified for all of the reading conditions, or may be specified for some reading conditions that have been selected as appropriate. In the case where reading adjustment values are not specified for all of the reading conditions, if reading adjustment values have not been specified for a reading condition that was designated by the user at the time of actual reading, the display unit 15 displays a warning to that effect. This allows the user to selectively carry out one of: execution of the actual reading after the reading adjustment values are specified; changing of the reading condition; and execution of the actual reading without executing the reading adjustment.

According to the above embodiments, distortion of the reading executed by the reading mechanism 7 and the like can be corrected with high accuracy. By causing the reading mechanism 7 to read an image of an adjustment chart for printing executed by the printing mechanism 12, reading adjustment and printing adjustment can be executed through single reading, which allows for efficient processing and saving of printing mediums. Note that reading adjustment and printing adjustment may be executed separately. That is to say, the aforementioned reading adjustment may be executed using a printing medium for reading adjustment (printing adjustment is not executed). In this case, instead of causing the printing mechanism 12 to print the printing medium for reading adjustment, a printing medium for reading adjustment that has been prepared in advance may be used. Therefore, the aforementioned processing can be applied to a reading apparatus that does not have a printing mechanism.

In the above-described processing, a chart placed on the original plate is read; alternatively, a printing medium on which a reading adjustment chart has been printed may be set on an original conveyance apparatus and conveyed so as to be read by the reading mechanism 7. This enables reading adjustment in consideration of distortion attributed to the conveyance by the original conveyance apparatus and the like. Furthermore, while the above-described processing is executed by an apparatus with the reading mechanism 7, similar processing may be executed by the external apparatus 19. That is to say, the external apparatus 19 (for example, a scanner driver) acquires image data that has been acquired by a reading apparatus such as the image processing apparatus 1 reading an image of the reading adjustment chart, and executes the above-described processing. Specified reading adjustment values and the reading apparatus are stored in correspondence in a memory of the external apparatus or in a memory of the reading apparatus. In this case, the external apparatus 19 functions as an image processing apparatus. In addition, various embodiments, including the ones described above, may be realized in any combination.

The present invention is realized also by executing the following processing. Software (program) for realizing the functions of the above embodiments is provided to a system or an apparatus via a network or via various types of computer-readable storage mediums, and a computer (or a CPU, an MPU, etc.) of that system or apparatus reads and executes the program. At this time, the processing may be executed by a single computer, or by a plurality of computers in coordination. The entirety of the processing may be executed by the software, and a part or the entirety of the processing may be executed by hardware such as an ASIC (application-specific integrated circuit).

<Other Embodiments>

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-032440, filed Feb. 21, 2013, which is hereby incorporated by reference herein in its entirety.

What is claimed is:

1. An apparatus comprising:
an acquisition unit configured to acquire image data read by a reading unit reading an image of a predetermined pattern printed on a printing medium, wherein the reading is performed by the reading unit executing scanning relative to the printing medium, and the predetermined pattern includes a mark for detecting a position of the printing medium and a plurality of patterns for detecting a distortion of an image of the image data acquired by the acquisition unit;
an obtaining unit configured to obtain displacement amounts between a plurality of regions in the image data acquired by the acquisition unit and ideal positions of the plurality of regions, based on the mark and the plurality of patterns, wherein the plurality of regions correspond to the plurality of patterns;
a specification unit configured to specify reading adjustment values in accordance with the displacement amounts between the plurality of regions and the ideal positions obtained by the obtaining unit; and
a correction unit configured to correct reading processing of the reading unit in accordance with the reading adjustment values specified by the specification unit.

2. The apparatus according to claim 1, wherein the correction unit corrects image data read by the reading unit based on the reading adjustment values specified by the specification unit.

3. The apparatus according to claim 1, wherein the correction unit corrects a read timing of the reading unit based on the reading adjustment values specified by the specification unit.

4. The apparatus according to claim 1, further comprising:
a printing unit configured to print an image on a printing medium; and
a printing adjustment unit configured to adjust printing processing of the printing unit based on the image data acquired by the acquisition unit.

5. The apparatus according to claim 4, further comprising a storage unit configured to store the image data corresponding to the predetermined pattern, wherein the printing adjustment unit adjusts the printing processing of the printing unit based on the image data corresponding to the predetermined pattern stored in the storage unit.

6. The apparatus according to claim 1, wherein
the acquisition unit acquires the image data read by the reading unit in accordance with a plurality of reading conditions, and
the specification unit specifies the reading adjustment values for each of the plurality of reading conditions based on the image data acquired by the acquisition unit.

7. The apparatus according to claim 6, further comprising a calculation unit configured to calculate a reading adjustment value corresponding to another reading condition based on the reading adjustment values specified by the specification unit in correspondence with the plurality of reading conditions.

8. The apparatus according to claim 1, wherein the reading unit reads the image on the printing medium conveyed by an original conveyance apparatus.

9. The apparatus according to claim 1, wherein the specification unit specifies the reading adjustment values for suppressing the distortion which occurs in the image read by the reading unit.

10. The apparatus according to claim 1, wherein the obtaining unit obtains the displacement amounts by a calculation based on the plurality of patterns.

11. The apparatus according to claim 2, wherein the correction unit corrects the image data acquired by the acquisition unit using the reading adjustment values that correspond to different positions on an image of the image data.

12. The apparatus according to claim 1, wherein the apparatus includes the reading unit.

13. A method comprising the steps of:
acquiring image data read by a reading unit reading an image of a predetermined pattern printed on a printing medium, wherein the reading is performed by the reading unit executing scanning relative to the printing medium, and the predetermined pattern includes a mark for detecting a position of the printing medium and a plurality of patterns for detecting a distortion of an image of the image data acquired by the acquisition step;
obtaining displacement amounts between a plurality of regions in the image data acquired by the acquisition step and ideal positions of the plurality of regions, based on the mark and the plurality of patterns, wherein the plurality of regions correspond to the plurality of patterns;
specifying reading adjustment values in accordance with the displacement amounts between the plurality of regions and the ideal positions obtained by the obtaining step; and
correcting reading processing of the reading unit in accordance with the specified reading adjustment values.

14. The method according to claim 13, wherein in the correction step, image data read by the reading unit is corrected based on the specified reading adjustment values.

15. The method according to claim 13, wherein in the correction step, a read timing of the reading unit is corrected based on the specified reading adjustment values.

16. The method according to claim 13, further comprising the steps of:
adjusting printing processing of a printing unit based on the acquired image data; and
causing the printing unit to print an image based on the acquired image data in accordance with a result of the adjustment.

17. The method according to claim 16, further comprising the step of adjusting the printing processing of the printing unit based on the acquired image data corresponding to the predetermined pattern stored in a memory.

18. The method according to claim 13, wherein
in the acquisition step, the image data read by the reading unit in accordance with a plurality of reading conditions are acquired, and
in the specification step, the reading adjustment values are specified for each of the plurality of reading conditions based on the acquired image data.

19. The method according to claim 18, further comprising the step of calculating a reading adjustment value corresponding to another reading condition based on the reading adjustment values specified in correspondence with the plurality of reading conditions.

20. The method according to claim 13, wherein in the acquisition step, the image data read by the reading unit reading the image on the printing medium conveyed by a document feeder is acquired.

21. The method according to claim 13, wherein the specification step specifies the reading adjustment values for suppressing the distortion which occurs in the image read by the reading step.

22. The method according to claim 13, wherein the obtaining step obtains the displacement amounts by a calculation based on the plurality of patterns.

23. The method according to claim 14, wherein the correction step corrects the image data acquired by the acquisition step using the reading adjustment values that correspond to different positions on an image of the image data.

24. A non-transitory computer-readable storage medium that stores therein a program for:
- acquiring image data read by a reading unit reading an image of a predetermined pattern printed on a printing medium, wherein the reading is performed by the reading unit executing scanning relative to the printing medium, and the predetermined pattern includes a mark for detecting a position of the printing medium and a plurality of patterns for detecting a distortion of an image of the image data acquired by the acquisition step;
- obtaining displacement amounts between a plurality of regions in the image data acquired by the acquisition step and ideal positions of the plurality of regions, based on the mark and the plurality of patterns, wherein the plurality of regions correspond to the plurality of patterns;
- specifying reading adjustment values in accordance with the displacement amounts between the plurality of regions and the ideal positions obtained by the obtaining step; and
- correcting reading processing of the reading unit in accordance with the specified reading adjustment values.

* * * * *